US012701264B2

(12) United States Patent
Choi et al.

(10) Patent No.: US 12,701,264 B2
(45) Date of Patent: *Aug. 4, 2026

(54) METHOD FOR PARAMETER SET REFERENCE CONSTRAINTS IN CODED VIDEO STREAM

(71) Applicant: TENCENT AMERICA LLC, Palo Alto, CA (US)

(72) Inventors: Byeongdoo Choi, Palo Alto, CA (US); Shan Liu, Palo Alto, CA (US); Stephan Wenger, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,396

(22) Filed: Apr. 13, 2023

(65) Prior Publication Data

US 2023/0254506 A1      Aug. 10, 2023

Related U.S. Application Data

(63) Continuation of application No. 17/564,011, filed on Dec. 28, 2021, now Pat. No. 11,706,445, and a (Continued)

(51) Int. Cl.
H04N 19/59         (2014.01)
H04N 19/105        (2014.01)
H04N 19/174        (2014.01)
(52) U.S. Cl.
CPC ........... H04N 19/59 (2014.11); H04N 19/105 (2014.11); H04N 19/174 (2014.11)

(58) Field of Classification Search
None
See application file for complete search history.

(56)                References Cited

U.S. PATENT DOCUMENTS

2008/0137744 A1      6/2008  Moriya
2008/0232467 A1      9/2008  Guchi
                    (Continued)

FOREIGN PATENT DOCUMENTS

CN          113692744  A      11/2021
CN          113796080  A      12/2021
                    (Continued)

OTHER PUBLICATIONS

Byeongdoo Choi et al., "MV-HEVC/SHVC HLS: Random access of multiple layers", Joint Collaborative Team on Video Coding (JCT-VC) of ITU-T SG 16 WP 3 and ISO/IEC JTC 1/SC 29/WG 11, JCTVC-N0121r1, Jul. 25, 2013-Aug. 2, 2013, 14th Meeting, Vienna, AT (4 pages total).

(Continued)

*Primary Examiner* — Stefan Gadomski
(74) *Attorney, Agent, or Firm* — Sughrue Mion, PLLC

(57)                ABSTRACT
There is included a method and apparatus comprising computer code configured to cause a processor or processors to perform obtaining video data comprising data of a plurality of semantically independent source pictures, determining, among the video data, whether references are associated with any of a first access unit (AU) and a second AU according to at least one picture order count (POC) signal value included with the video data, and outputting a first quantity of the references set to the first AU and a second quantity of the references set to the second AU based on the at least one POC signal value.

20 Claims, 22 Drawing Sheets

2200

Related U.S. Application Data continuation of application No. 17/063,085, filed on Oct. 5, 2020, now Pat. No. 11,356,698.

(60) Provisional application No. 62/954,883, filed on Dec. 30, 2019.

(56)                    References Cited

U.S. PATENT DOCUMENTS

| | | |
|---|---|---|
| 2010/0020884 A1 | 1/2010 | Pandit et al. |
| 2013/0182755 A1 | 7/2013 | Chen |
| 2013/0272372 A1* | 10/2013 | Hannuksela ........... H04N 19/70 |
| | | 375/240.01 |
| 2013/0287366 A1 | 10/2013 | Wang |
| 2014/0063185 A1 | 3/2014 | Chen |
| 2014/0168362 A1 | 6/2014 | Hannuksela et al. |
| 2014/0218473 A1 | 8/2014 | Hannuksella et al. |
| 2014/0294076 A1 | 10/2014 | Misra et al. |
| 2014/0301484 A1* | 10/2014 | Wang ..................... H04N 19/91 |
| | | 375/240.26 |
| 2014/0321529 A1 | 10/2014 | Jung |
| 2014/0341289 A1 | 11/2014 | Schwarz et al. |
| 2014/0341291 A1 | 11/2014 | Schwarz et al. |
| 2015/0003529 A1 | 1/2015 | Thirumalai et al. |
| 2015/0030074 A1 | 1/2015 | Nakagami et al. |
| 2015/0103903 A1 | 4/2015 | Ramasubramonian |
| 2015/0103912 A1 | 4/2015 | Lee |
| 2015/0103923 A1 | 4/2015 | Ramasubramonian |
| 2015/0139320 A1 | 5/2015 | Wang |
| 2015/0146787 A1 | 5/2015 | Hendry |
| 2015/0156501 A1 | 6/2015 | Hannuksela |
| 2015/0163520 A1 | 6/2015 | Martin |
| 2015/0172667 A1 | 6/2015 | Hendry |
| 2015/0181233 A1 | 6/2015 | Ramasubramonian |
| 2015/0195561 A1 | 7/2015 | Wang |
| 2015/0264366 A1 | 9/2015 | Hendry |
| 2015/0271525 A1 | 9/2015 | Hendry |
| 2015/0271526 A1 | 9/2015 | Hendry |
| 2015/0304665 A1 | 10/2015 | Hannuksela et al. |
| 2015/0373342 A1 | 12/2015 | Hendry |
| 2015/0382018 A1* | 12/2015 | Hendry ................ H04N 19/597 |
| | | 375/240.12 |
| 2016/0065983 A1 | 3/2016 | Choi |
| 2016/0088306 A1 | 3/2016 | Sjoberg |
| 2016/0261877 A1 | 9/2016 | Wang |
| 2016/0269740 A1 | 9/2016 | Choi |
| 2016/0323590 A1 | 11/2016 | Li |
| 2016/0353115 A1 | 12/2016 | Samuelsson |
| 2016/0381393 A1 | 12/2016 | Tsukuba et al. |
| 2017/0013259 A1 | 1/2017 | Li |
| 2017/0026655 A1* | 1/2017 | Deshpande ............ H04N 19/61 |
| 2017/0118466 A1 | 4/2017 | Nakagami |
| 2017/0280141 A1 | 9/2017 | Chou |
| 2018/0063550 A1 | 3/2018 | Tech |
| 2019/0215532 A1 | 7/2019 | He |
| 2019/0238864 A1 | 8/2019 | Xiu et al. |
| 2019/0268608 A1 | 8/2019 | Ma |
| 2019/0373245 A1 | 12/2019 | Lee et al. |
| 2020/0053359 A1 | 2/2020 | Lee |
| 2020/0120359 A1 | 4/2020 | Hanhart |
| 2020/0145663 A1 | 5/2020 | Li |
| 2020/0177916 A1 | 6/2020 | Niamut |
| 2020/0351507 A1 | 11/2020 | Li |
| 2021/0037248 A1 | 2/2021 | Kondo |
| 2021/0092394 A1 | 3/2021 | Tsai |

FOREIGN PATENT DOCUMENTS

| | | |
|---|---|---|
| CN | 113874875 A | 12/2021 |
| EP | 4 032 284 A1 | 7/2022 |
| EP | 4 035 383 A1 | 8/2022 |
| EP | 4 081 936 A1 | 11/2022 |
| WO | 2017158236 A2 | 9/2017 |
| WO | 2019/137171 A1 | 7/2019 |
| WO | 2019182704 A1 | 9/2019 |
| WO | 2021/055738 A1 | 3/2021 |
| WO | 2021/061628 A1 | 4/2021 |
| WO | 2021/133452 A1 | 7/2021 |

OTHER PUBLICATIONS

Benjamin Bross et al., "Versatile Video Coding (Draft 7)", Joint Video Experts Team (JVET) of ITU-T SG 16 WP 3 and ISO/IEC JTC 1/SC 29/WG 11, JVET-P2001-vE, Oct. 1-11, 2019, 16th Meeting, Geneva, CH (489 pages total).

Byeongdoo Choi et al., "AHG8: Region-wise scalability support with reference picture resampling", Joint Video Experts Team (JVET) of ITU-T SG 16 WP 3 and ISO/IEC JTC 1/SC 29/WG 11, JVET-O0336, Jul. 3-12, 2019, 15th Meeting, Gothenburg, SE (5 pages total).

Byeongdoo Choi et al., "AHG8/AHG9: On video parameter set ID", Joint Video Experts Team (JVET) of ITU-T SG 16 WP 3 and ISO/IEC JTC 1/SC 29/WG 11, JVET-Q0280-v2, Jan. 7-17, 2020, 17th Meeting, Brussels, BE (2 pages total).

Byeongdoo Choi et al., "AHG9: On adaptation parameter set identification", Joint Video Experts Team (JVET) of ITU-T SG 16 WP 3 and ISO/IEC JTC 1/SC 29/WG 11, JVET-Q0285, Jan. 7-17, 2020, 17th Meeting, Brussels, BE (4 pages total).

Extended European Search Report issued Mar. 27, 2023 in European Application No. 20908723.8.

Benjamin Bross et al., "Versatile Video Coding (Draft 6)", Joint Video Experts Team (JVET) of ITU-T SG 16 WP 3and ISO/IEC JTC 1/SC 29/WG 11, Jul. 3, 2019-Jul. 12, 2019, 455pages.

Byeongdoo Choi et al., "AHG8: On spatial scalability support with reference picture resampling", Joint Video Experts Team (JVET) of ITU-T SG 16 WP 3 and ISO/IEC JTC 1/SC 29/WG 11, JVET-O0333, Jul. 3-12, 2019, 15th Meeting, Gothenburg, SE (7 pages total).

Communication dated Feb. 6, 2023, issued by the Intellectual Property Office of Singapore in application No. 11202111496X.

International Search Report dated Jan. 15, 2021 from the International Searching Authority in International Application No. PCT/US2020055759.

Office Action issued Nov. 14, 2022 in Japanese Application No. 2021-559386.

Written Opinion dated Jan. 15, 2021 from the International Bureau in International Application No. PCT/US2020055759.

Communication dated Aug. 27, 2024, issued in Singapore Application No. 11202111496X.

* cited by examiner

| | |
|---|---|
| tile_group_header( ) { | |
| ... | |
| if(adaptive_pic_resolution_change_flag) { | |
| dec_pic_size_idx | u(1) |
| } | |
| ... | |
| } | |

601 — tile_group_header( ) {
603 — if(adaptive_pic_resolution_change_flag) {
602 — dec_pic_size_idx

| | Descriptor |
|---|---|
| seq_parameter_set_rbsp( ) { | |
| ... | |
| adaptive_pic_resolution_change_flag | u(1) |
| if(adaptive_pic_resolution_change_flag) { | |
| output_pic_width_in_luma_samples | ue(v) |
| output_pic_height_in_luma_samples | ue(v) |
| reference_pic_size_present_flag | u(1) |
| if(reference_pic_size_present_flag) | |
| } | |
| reference_pic_width_in_luma_samples | ue(v) |
| reference_pic_height_in_luma_samples | ue(v) |
| } | |
| num_dec_pic_size_in_luma_samples_minus1 | ue(v) |
| for( i = 0; i <= num_dec_pic_size_in_luma_samples_minus1; i++ ) { | |
| dec_pic_width_in_luma_samples[ i ] | ue(v) |
| dec_pic_height_in_luma_samples[ i ] | ue(v) |
| } | |
| ... | |
| } | |

610 — seq_parameter_set_rbsp( ) {
611 — adaptive_pic_resolution_change_flag
612 — if(adaptive_pic_resolution_change_flag) {
613 — output_pic_width_in_luma_samples
614 — if(reference_pic_size_present_flag)
615 — reference_pic_width_in_luma_samples
616 — num_dec_pic_size_in_luma_samples_minus1
617 — dec_pic_width_in_luma_samples[ i ]

Fig. 9

| | Descriptor |
|---|---|
| video_parameter_set_rbsp( ) { | |
| vps_video_parameter_set_id | u(4) |
| vps_max_layers_minus1 | u(8) |
| for( i = 0; i <= vps_max_layers_minus1; i++ ) { | |
| vps_included_layer_id[ i ] | u(7) |
| vps_reserved_zero_bit | u(1) |
| } | |
| vps_constraint_info_present_flag | u(1) |
| vps_constant_poc_cycle_per_au | u(1) |
| if(vps_constant_poc_cycle_per_au) | |
| vps_poc_cycle_au | u(8) |
| ... | |
| } | |

| | Descriptor |
|---|---|
| slice_header( ) { | |
| slice_pic_parameter_set_id | ue(v) |
| if( rect_slice_flag \|\| NumBricksInPic > 1 ) | |
| slice_address | u(v) |
| if( !rect_slice_flag && !single_brick_per_slice_flag ) | |
| num_bricks_in_slice_minus1 | ue(v) |
| slice_type | ue(v) |
| if( NalUnitType == GRA_NUT ) | |
| recovery_poc_cnt | se(v) |
| slice_pic_order_cnt_lsb | u(v) |
| ... | |
| if(!vps_constant_poc_cycle_per_au) | |
| slice_poc_cycle_au | u(8) |
| ... | |
| } | |

900

1000

1300

S20 — Decode the video bitstream with multi-layers

S21 — Identify the background region and one or more foreground sub-pictures

S22 — Is a specific sub-picture region selected?

No

S24 — Decode and display the background region

Yes

S23 — Decode and display the enhanced sub-picture.

Figure 14:
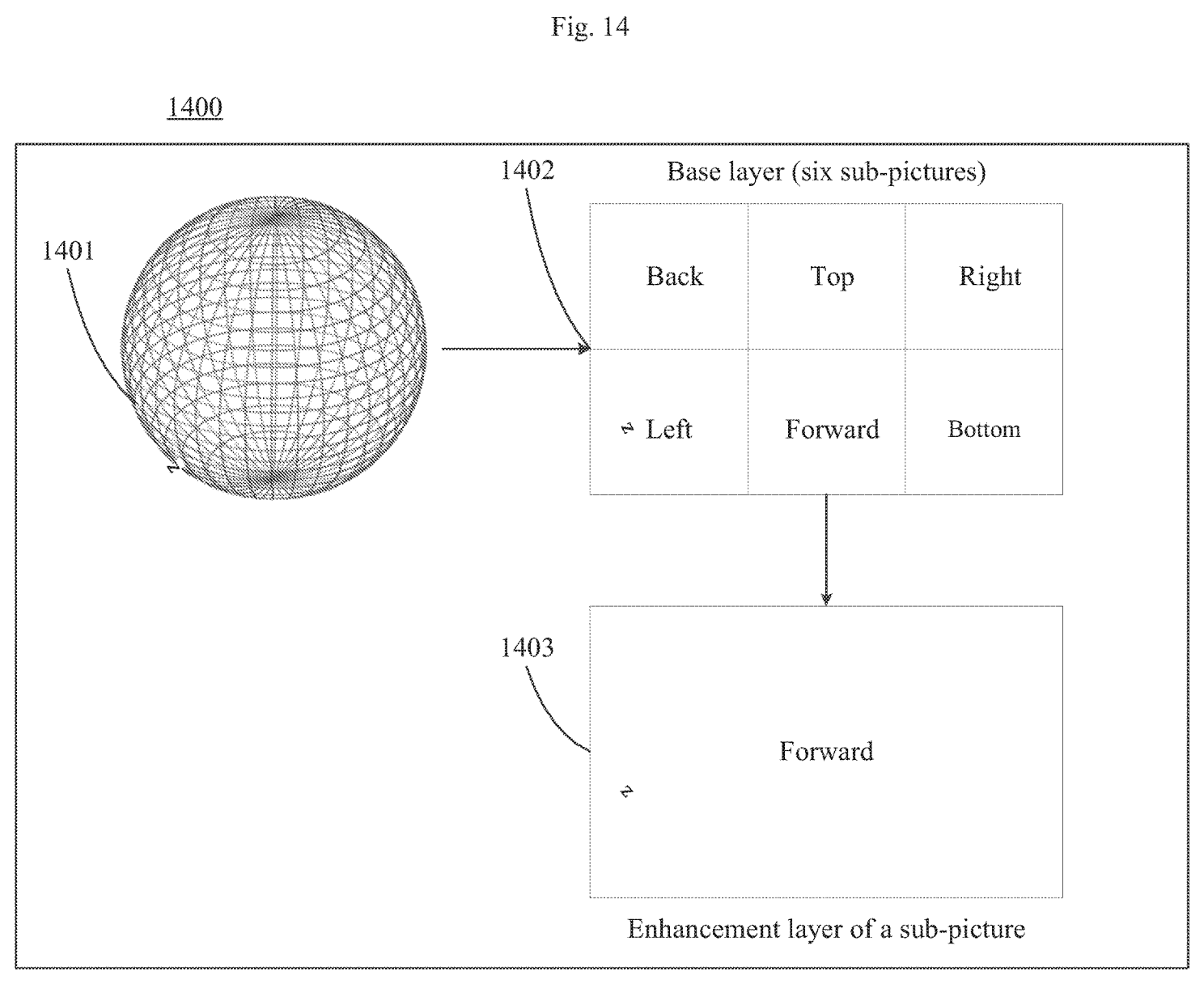

Base layer (six sub-pictures)

| Back | Top | Right |
| Left | Forward | Bottom |

1402

Forward

1403

Enhancement layer of a sub-picture

Figure 17:
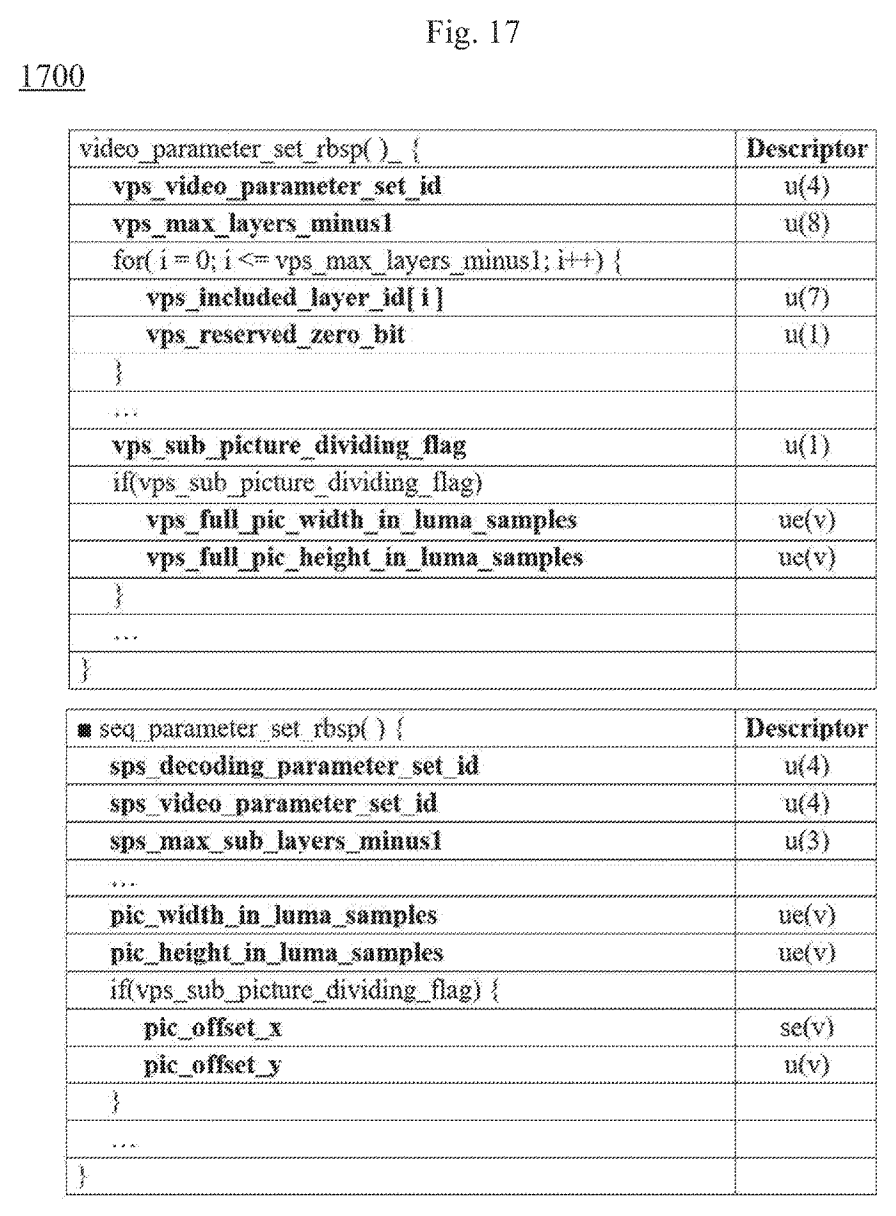

| video_parameter_set_rbsp( ) { | Descriptor |
|---|---|
| vps_video_parameter_set_id | u(4) |
| vps_max_layers_minus1 | u(8) |
| for( i = 0; i <= vps_max_layers_minus1; i++ ) { | |
| vps_included_layer_id[ i ] | u(7) |
| vps_reserved_zero_bit | u(1) |
| } | |
| ... | |
| vps_sub_picture_dividing_flag | u(1) |
| if(vps_sub_picture_dividing_flag) | |
| vps_full_pic_width_in_luma_samples | ue(v) |
| vps_full_pic_height_in_luma_samples | ue(v) |
| } | |
| ... | |
| } | |

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| ... | |
| pic_width_in_luma_samples | ue(v) |
| pic_height_in_luma_samples | ue(v) |
| if(vps_sub_picture_dividing_flag) { | |
| pic_offset_x | se(v) |
| pic_offset_y | u(v) |
| } | |
| ... | |
| } | |

| | Descriptor |
|---|---|
| sub_region_partitioning_info( payloadSize ) { | |
| num_sub_region | ue(v) |
| num_layers | ue(v) |
| for( i = 0; i <= num_layers; i++) { | |
| layer_id[ i ] | ue(v) |
| for( i = 1; i < num_layers; i++) { | |
| for( i = 0; i < i; i++) { | |
| direct_dependency_flag | u(1) |
| for( i = 0; i < num_sub_region[ i ]; j++) { | |
| num_layers_for_region[ i ] | ue(v) |
| for( i = 0; j < num_layers for region [ i ]; j++ ) | |
| sub_region_layer_id[ i ][ j ] | ue(v) |
| sub_region_offset_x[ i ] | ue(v) |
| sub_region_offset_y[ i ] | ue(v) |
| sub_region_width[ i ] | ue(v) |
| sub_region_height[ i ] | ue(v) |
| } | |
| ... | |
| } | |

| | Descriptor |
|---|---|
| video parameter set rbsp( ) { | |
| ... | |
| vps max layers minus1 | u(6) |
| num output layer sets | ue(v) |
| num profile tier level | ue(v) |
| for( i = 0; i < num profile tier level; i++ ) | |
| profile tier level( vps max sub layers minus1 ) | |
| for( i = 0; i < num output layer sets; i++) | |
| for( j = 0; j < NumLayersInIdList[ i ]; i++ ) { | |
| output layer flag[ i ][ j ] | u(1) |
| profile tier level idx[ i ][ j ] | u(v) |
| ... | |
| ... | |

Figure 20:
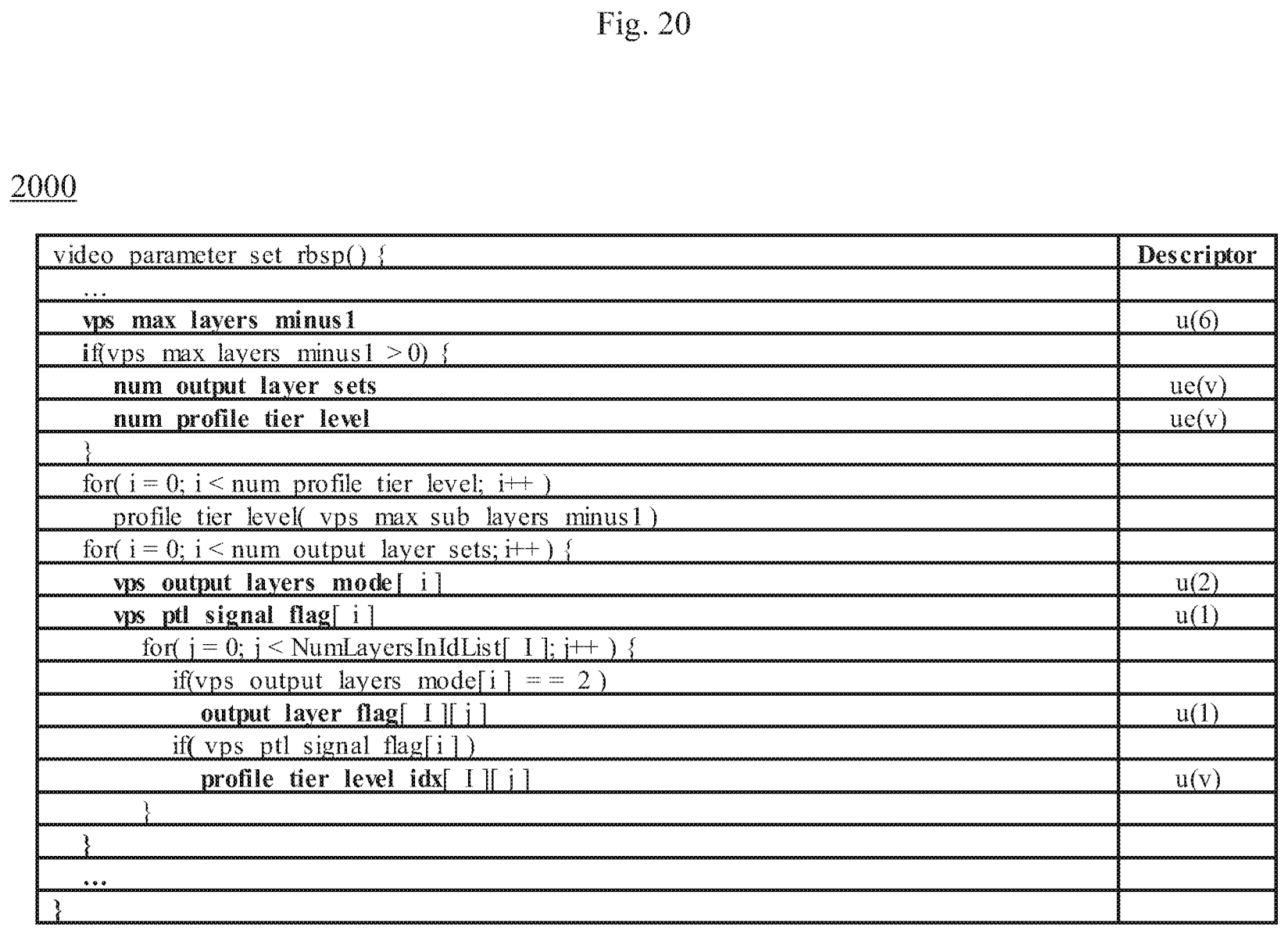

| | Descriptor |
|---|---|
| video_parameter_set_rbsp( ) { | |
| ... | |
| vps_max_layers_minus1 | u(6) |
| if(vps_max_layers_minus1 > 0) { | |
| num_output_layer_sets | ue(v) |
| num_profile_tier_level | ue(v) |
| ~ | |
| for( i = 0; i < num_profile_tier_level; i++ ) | |
| profile_tier_level( vps_max_sub_layers_minus1 ) | |
| for( i = 0; i < num_output_layer_sets; i++ ) { | |
| vps_output_layers_mode[ i ] | u(2) |
| vps_ptl_signal_flag[ i ] | u(1) |
| for( j = 0; j < NumLayersInIdList[ i ]; j++ ) { | |
| if(vps_output_layers_mode[ i ] == 2 ) | |
| output_layer_flag[ i ][ j ] | u(1) |
| if( vps_ptl_signal_flag[ i ] ) | |
| profile_tier_level_idx[ i ][ j ] | u(v) |
| ~ | |
| ... | |
| ~ | |

| | Descriptor |
|---|---|
| video_parameter_set_rbsp( ) { | |
| ... | |
|   vps_max_layers_minus1 | u(6) |
|   if(vps_max_layers_minus1 > 0) { | |
|     num_output_layer_sets | ue(v) |
|     num_profile_tier_level | ue(v) |
|   } | |
|   max_subpics_minus1 | u(8) |
|   for( i = 0; i < max_subpics_minus1; i++ ) { | |
|     sub_pic_id[i] | u(8) |
|   } | |
|   for( i = 0; i < num_profile_tier_level; i++ ) | |
|     profile_tier_level( vps_max_sub_layers_minus1 ) | |
|   for( i = 0; i < num_output_layer_sets; i++ ) { | |
|     vps_output_layers_mode[ i ] | u(2) |
|     vps_ptl_signal_flag[ i ] | u(1) |
|     for( j = 0; i < NumLayersInIdList[ i ];i++ ) { | |
|       num_output_subpic_layer[i][j] | ue(v) |
|       for( k = 0; k < num_output_subpic_layer[i][j]; k++ ) | |
|         sub_pic_id_layer[i][j][ k] | u(8) |
|     if(vps_output_layers_mode[i] == 2 ) | |
|       output_layer_flag[ i ][j ] | u(1) |
|     if( vps_ptl_signal_flag[i] ) | |
|       profile_tier_level_idx[ i ][j ] | u(v) |
|     } | |
|   ... | |
|   } | |

2200

METHOD FOR PARAMETER SET REFERENCE CONSTRAINTS IN CODED VIDEO STREAM

CROSS-REFERENCES TO RELATED APPLICATIONS/PRIORITY CLAIM

This is a Continuation Application of U.S. patent application Ser. No. 17/564,011, filed May Dec. 28, 2021, which is Continuation Application of U.S. patent application Ser. No. 17/063,085, filed Oct. 5, 2020, which claims priority to provisional application U.S. 62/954,883 filed on Dec. 30, 2019, the entire contents of each of which being hereby expressly incorporated by reference, in their entireties, into the present application.

FIELD

The disclosed subject matter relates to video coding and decoding, and more specifically according to exemplary embodiments, to a parameter set reference and scope in a coded video stream.

BACKGROUND

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Historically, video encoders and decoders tended to operate on a given picture size that was, in most cases, defined and stayed constant for a coded video sequence (CVS), Group of Pictures (GOP), or a similar multi-picture timeframe. For example, in MPEG-2, system designs are known to change the horizontal resolution (and, thereby, the picture size) dependent on factors such as activity of the scene, but only at I pictures, hence typically for a GOP. The resampling of reference pictures for use of different resolutions within a CVS is known, for example, from ITU-T Rec. H.263 Annex P. However, here the picture size does not change, only the reference pictures are being resampled, resulting potentially in only parts of the picture canvas being used (in case of downsampling), or only parts of the scene being captured (in case of upsampling). Further, H.263 Annex Q allows the resampling of an individual macroblock by a factor of two (in each dimension), upward or downward. Again, the picture size remains the same. The size of a macroblock is fixed in H.263, and therefore does not need to be signaled.

Changes of picture size in predicted pictures became more mainstream in modern video coding. For example, VP9 allows reference picture resampling and change of resolution for a whole picture. Similarly, certain proposals made towards VVC (including, for example, Hendry, et. al, "On adaptive resolution change (ARC) for VVC", Joint Video Team document JVET-M0135-v1, Jan. 9-19, 2019, incorporated herein in its entirety) allow for resampling of whole reference pictures to different—higher or lower—resolutions. In that document, different candidate resolutions are suggested to be coded in the sequence parameter set and referred to by per-picture syntax elements in the picture parameter set.

Compressed domain aggregation or extraction of multiple semantically independent picture parts into a single video picture has gained some attention. In particular, in the context of, for example, 360 coding or certain surveillance applications, multiple semantically independent source pictures (for examples the six cube surface of a cube-projected 360 scene, or individual camera inputs in case of a multi-camera surveillance setup) may require separate adaptive resolution settings to cope with different per-scene activity at a given point in time.

SUMMARY

Disclosed are techniques for signaling of adaptive picture size in a video bitstream.

There is included a method and apparatus comprising memory configured to store computer program code and a processor or processors configured to access the computer program code and operate as instructed by the computer program code. The computer program includes obtaining code configured to cause the at least one processor to obtain video data comprising data of a plurality of semantically independent source pictures, determining code configured to cause the at least one processor to determine, among the video data, whether references are associated with any of a first access unit (AU) and a second AU according to at least one picture order count (POC) signal value included with the video data, and outputting code configured to cause the at least one processor to output a first quantity of the references set to the first AU and a second quantity of the references set to the second AU based on the at least one POC signal value.

According to exemplary embodiments, the references comprise at least one of pictures, slices, and tiles of the video data.

According to exemplary embodiments, determining whether the references are associated with any of the first AU and the second AU comprises comparing respective POC values of each of the references with the at least one POC signal value.

According to exemplary embodiments, determining whether the references are associated with any of the first AU and the second AU further comprises setting the first quantity of the references to the first AU, in response to determining that each of the first quantity of the references respectively comprises one of a plurality of POC values less than the at least one POC signal value, and setting the second quantity of the references to the second AU, in response to determining that each of the second quantity of the references respectively comprises one of a second plurality of POC values equal to or greater than the at least one POC signal value, According to exemplary embodiments, the references comprise the slices, and the at least one POC signal value is included in a slice header of the video data.

According to exemplary embodiments, the video data comprises a video parameter set (VPS) data identifying a plurality of spatial layers of the video data.

According to exemplary embodiments, the at least one POC signal value is included in the video parameter set (VPS) of the video data.

According to exemplary embodiments, the determining code is further configured to cause the at least one processor to determine whether the VPS data comprises at least one flag indicating whether one or more of the references are divided into a plurality of sub-regions and to determine, in a case where the at least one flag indicates that the one or more of the references are divided into the plurality of sub-regions, at least one of, in luma samples, a full picture width and a full picture height of a picture of the one or more of the references.

According to exemplary embodiments, the determining code is further configured to cause the at least one processor to determine, in the case where the at least one flag indicates that the one or more of the references are divided into the plurality of sub-regions, a signaling value, included in a sequence parameter set of the video data, specifying an offset of a portion of at least one of the sub-regions.

According to exemplary embodiments, the plurality of semantically independent source pictures represent a spherical 360 picture.

BRIEF DESCRIPTION OF THE DRAWINGS

Further features, the nature, and various advantages of the disclosed subject matter will be more apparent from the following detailed description and the accompanying drawings in which:

FIG. 6 is an example of a syntax table in accordance with an embodiment.

FIG. 9 is an example of a syntax table in accordance with an embodiment.

FIG. 14 is a schematic illustration of 360 video display with an enhancement layer of a sub-picture.

FIG. 17 is an example of a syntax table for sub-picture layout information

FIG. 18 is an example of a syntax table of SEI message for sub-picture layout information.

FIG. 19 is an example of a syntax table to indicate output layers and profile/tier/level information for each output layer set.

FIG. 20 is an example of a syntax table to indicate output layer mode on for each output layer set.

FIG. 21 is an example of a syntax table to indicate the present subpicture of each layer for each output layer set.

PROBLEM TO BE SOLVED

As compressed domain aggregation or extraction of multiple semantically independent picture parts into a single video picture has gained some attention, in the context of, for example, 360 coding or certain surveillance applications, multiple semantically independent source pictures (for examples the six cube surface of a cube-projected 360 scene, or individual camera inputs in case of a multi-camera surveillance setup) may require separate adaptive resolution settings to cope with different per-scene activity at a given point in time. Therefore, there is disclosed herein, among other things, encoders, at a given point in time, that may choose to use different resampling factors for different semantically independent pictures that make up the whole 360 or surveillance scene. When combined into a single picture, that, in turn, requires that reference picture resampling is performed, and adaptive resolution coding signaling is available, for parts of a coded picture.

DETAILED DESCRIPTION

Figure 1:
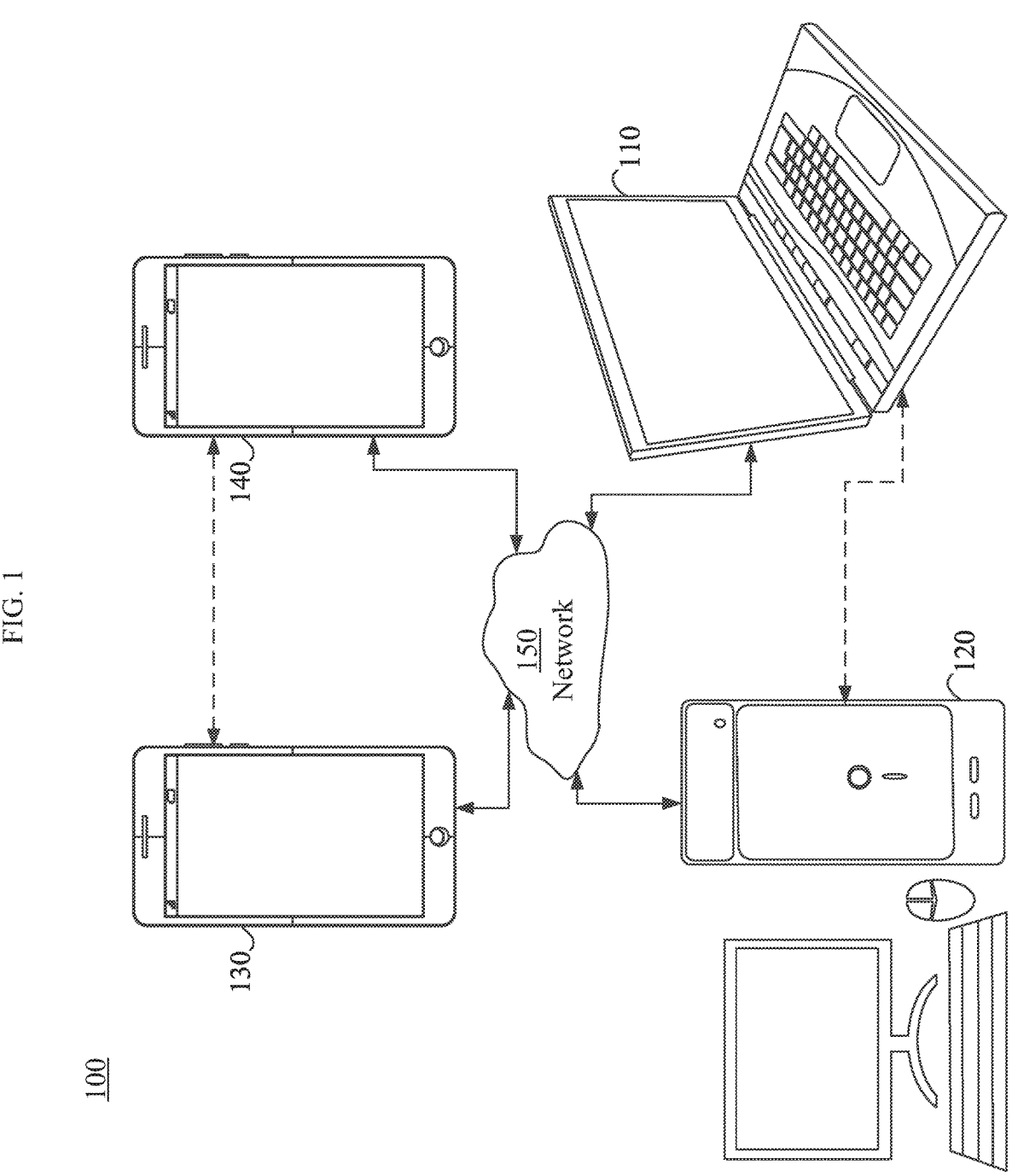
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110 and 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110, 120, 130, 140 may be illustrated as servers, personal computers and smart phones but the principles of the present disclosure may be not so limited. Embodiments of the present disclosure find application with laptop computers, tablet computers, media players and/or dedicated video conferencing equipment. The network 150 represents any number of networks that convey coded video data among the terminals 110, 120, 130, 140, including for example wireline and/or wireless communication networks. The communication network 150 may exchange data in circuit-switched and/or packet-switched channels. Representative networks include telecommunications networks, local area networks, wide area networks and/or the Internet. For the purposes of the present discussion, the architecture and topology of the network 150 may be immaterial to the operation of the present disclosure unless explained herein below.

Figure 2:
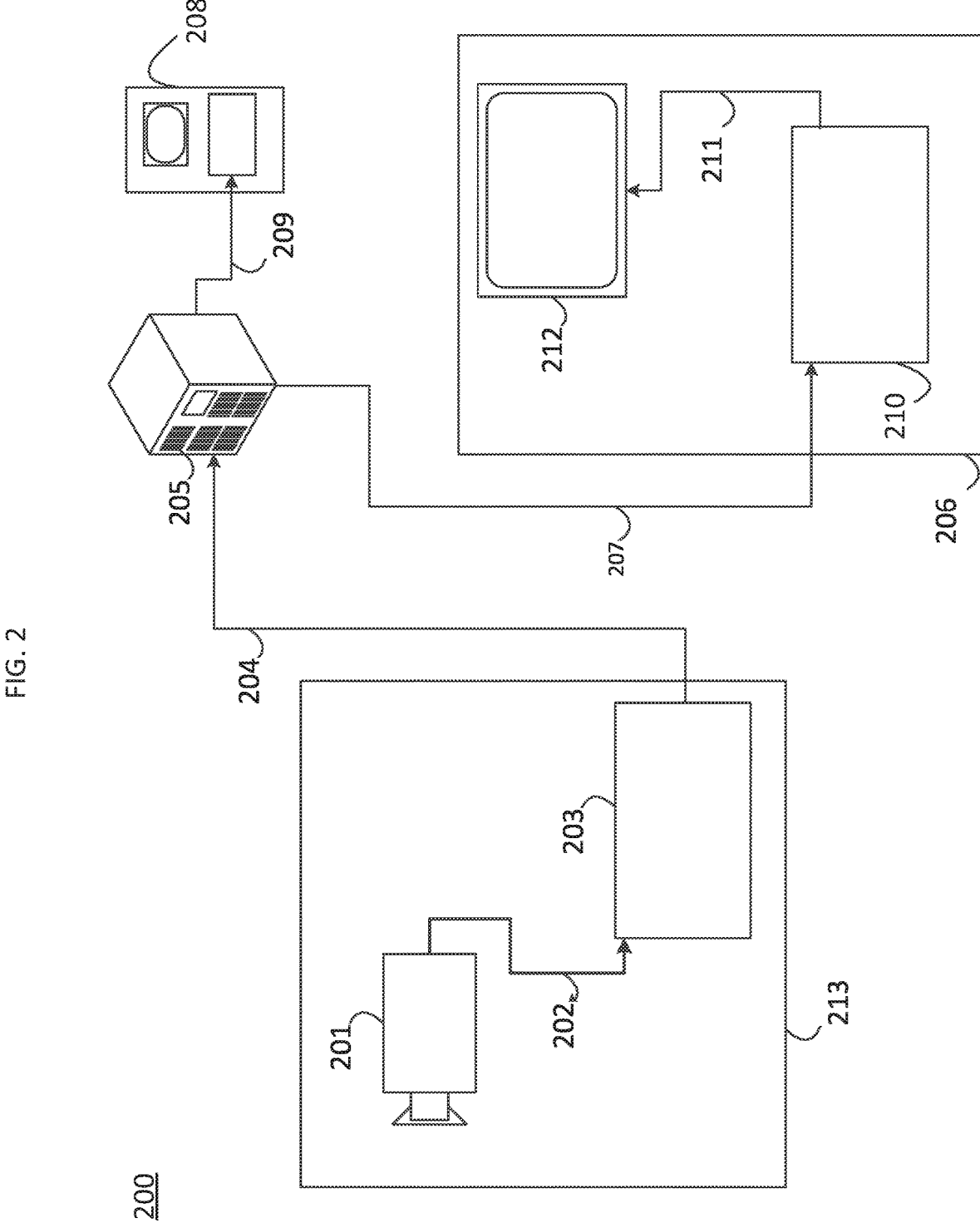
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 213, that can include a video source 201, for example a digital camera, creating a for example uncompressed video sample stream 202. That sample stream 202, depicted as a bold line to emphasize a high data volume when compared to encoded video bitstreams, can be processed by an encoder 203 coupled to the camera 201. The encoder 203 can include hardware, software, or a combination thereof to enable or implement aspects of the disclosed subject matter as described in more detail below. The encoded video bitstream 204, depicted as a thin line to emphasize the lower data volume when compared to the sample stream, can be stored on a streaming server 205 for future use. One or more streaming clients 206, 208 can access the streaming server 205 to retrieve copies 207, 209 of the encoded video bitstream 204. A client 206 can include a video decoder 210 which decodes the incoming copy of the encoded video bitstream 207 and creates an outgoing video sample stream 211 that can be rendered on a display 212 or other rendering device (not depicted). In some streaming systems, the video bitstreams 204, 207, 209 can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
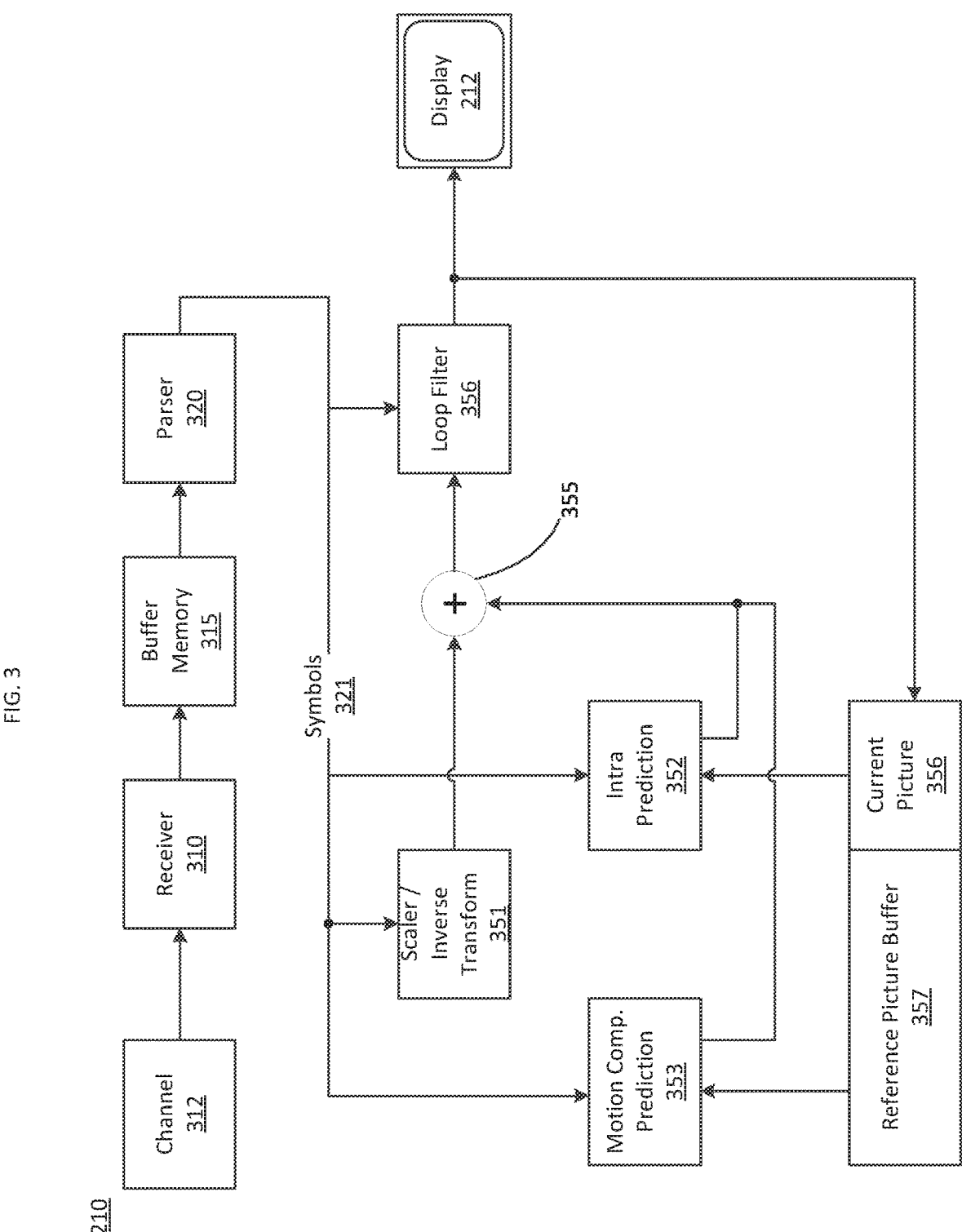
FIG. 3 is a schematic illustration of a simplified block diagram of a decoder in accordance with an embodiment.

FIG. 3 may be a functional block diagram of a video decoder 210 according to an embodiment of the present invention.

A receiver 310 may receive one or more codec video sequences to be decoded by the decoder 210; in the same or another embodiment, one coded video sequence at a time, where the decoding of each coded video sequence is independent from other coded video sequences. The coded video sequence may be received from a channel 312, which may be a hardware/software link to a storage device which stores the encoded video data. The receiver 310 may receive the encoded video data with other data, for example, coded audio data and/or ancillary data streams, that may be forwarded to their respective using entities (not depicted). The receiver 310 may separate the coded video sequence from the other data. To combat network jitter, a buffer memory 315 may be coupled in between receiver 310 and entropy decoder/parser 320 ("parser" henceforth). When receiver 310 is receiving data from a store/forward device of sufficient bandwidth and controllability, or from an isosychronous network, the buffer 315 may not be needed, or can be small. For use on best effort packet networks such as the Internet, the buffer 315 may be required, can be comparatively large and can advantageously of adaptive size.

The video decoder 210 may include an parser 320 to reconstruct symbols 321 from the entropy coded video sequence. Categories of those symbols include information used to manage operation of the decoder 210, and potentially information to control a rendering device such as a display 212 that is not an integral part of the decoder but can be coupled to it, as was shown in FIG. 2. The control information for the rendering device(s) may be in the form of Supplementary Enhancement Information (SEI messages) or Video Usability Information (VUI) parameter set fragments (not depicted). The parser 320 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 320 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 320 may perform entropy decoding/parsing operation on the video sequence received from the buffer 315, so to create symbols 321.

Reconstruction of the symbols 321 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 320. The flow of such subgroup control information between the parser 320 and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 351. The scaler/inverse transform unit 351 receives quantized transform coefficient as well as control information, including which transform to use, block size, quantization factor, quantization scaling matrices, etc. as symbol(s) 321 from the parser 320. It can output blocks comprising sample values, that can be input into aggregator 355.

In some cases, the output samples of the scaler/inverse transform 351 can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit 352 generates a block of the same size and shape of the block under reconstruction, using surrounding already reconstructed information fetched from the current (partly reconstructed) picture 356. The aggregator 355, in some cases, adds, on a per sample basis, the prediction information the intra prediction unit 352 has generated to the output sample information as provided by the scaler/inverse transform unit 351.

In other cases, the output samples of the scaler/inverse transform unit 351 can pertain to an inter coded, and potentially motion compensated block. In such a case, a Motion Compensation Prediction unit 353 can access reference picture memory 357 to fetch samples used for prediction. After motion compensating the fetched samples in accordance with the symbols 321 pertaining to the block, these samples can be added by the aggregator 355 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 321 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 355 can be subject to various loop filtering techniques in the loop filter unit 356. Video compression technologies can include in-loop filter technologies that are controlled by parameters included in the coded video bitstream and made available to the loop filter unit 356 as symbols 321 from the parser 320, but can also be responsive to meta-information obtained during the decoding of previous (in decoding order) parts of the coded picture or coded video sequence, as well as responsive to previously reconstructed and loop-filtered sample values.

The output of the loop filter unit 356 can be a sample stream that can be output to the render device 212 as well as stored in the reference picture memory 356 for use in future inter-picture prediction.

Certain coded pictures, once fully reconstructed, can be used as reference pictures for future prediction. Once a coded picture is fully reconstructed and the coded picture has been identified as a reference picture (by, for example, parser 320), the current reference picture 356 can become part of the reference picture buffer 357, and a fresh current picture memory can be reallocated before commencing the reconstruction of the following coded picture.

The video decoder 320 may perform decoding operations according to a predetermined video compression technology that may be documented in a standard, such as ITU-T Rec.

H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 310 may receive additional (redundant) data with the encoded video. The additional data may be included as part of the coded video sequence(s). The additional data may be used by the video decoder 320 to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
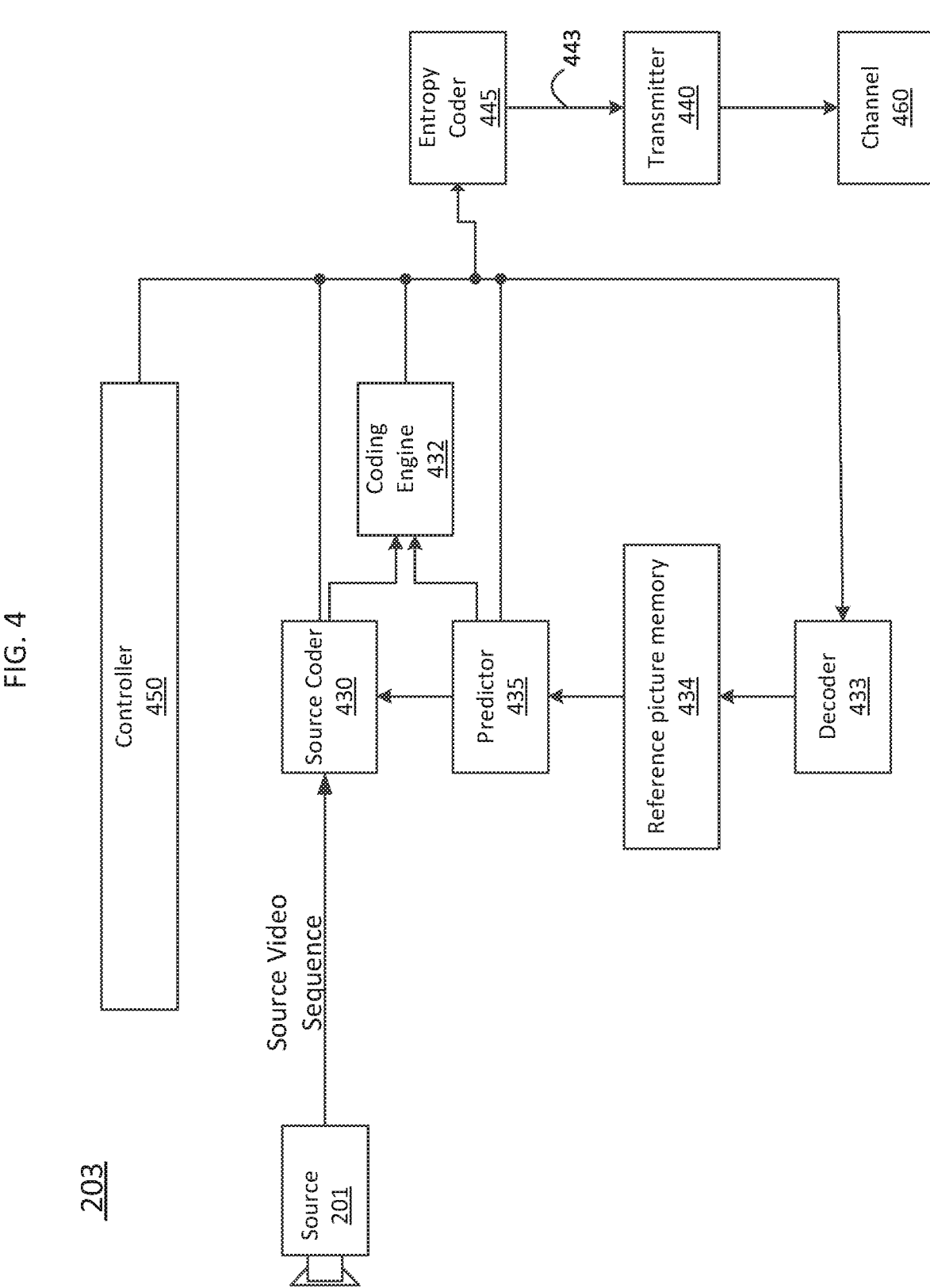
FIG. 4 is a schematic illustration of a simplified block diagram of an encoder in accordance with an embodiment.

FIG. 4 may be a functional block diagram of a video encoder 203 according to an embodiment of the present disclosure.

The encoder 203 may receive video samples from a video source 201 (that is not part of the encoder) that may capture video image(s) to be coded by the encoder 203.

The video source 201 may provide the source video sequence to be coded by the encoder 203 in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 201 may be a storage device storing previously prepared video. In a videoconferencing system, the video source 203 may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder 203 may code and compress the pictures of the source video sequence into a coded video sequence 443 in real time or under any other time constraints as required by the application. Enforcing appropriate coding speed is one function of controller 450. Controller 450 controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 450 as they may pertain to video encoder 203 optimized for a certain system design.

Some video encoders operate in what a person skilled in the are readily recognizes as a "coding loop". As an over-simplified description, a coding loop can consist of the encoding part of an encoder 430 ("source coder" henceforth) (responsible for creating symbols based on an input picture to be coded, and a reference picture(s)), and a (local) decoder 433 embedded in the encoder 203 that reconstructs the symbols to create the sample data a (remote) decoder also would create (as any compression between symbols and coded video bitstream is lossless in the video compression technologies considered in the disclosed subject matter). That reconstructed sample stream is input to the reference picture memory 434. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 433 can be the same as of a "remote" decoder 210, which has already been described in detail above in conjunction with FIG. 3. Briefly referring also to FIG. 3, however, as symbols are available and en/decoding of symbols to a coded video sequence by entropy coder 445 and parser 320 can be lossless, the entropy decoding parts of decoder 210, including channel 312, receiver 310, buffer 315, and parser 320 may not be fully implemented in local decoder 433.

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder 430 may perform motion compensated predictive coding, which codes an input frame predictively with reference to one or more previously-coded frames from the video sequence that were designated as "reference frames." In this manner, the coding engine 432 codes differences between pixel blocks of an input frame and pixel blocks of reference frame(s) that may be selected as prediction reference(s) to the input frame.

The local video decoder 433 may decode coded video data of frames that may be designated as reference frames, based on symbols created by the source coder 430. Operations of the coding engine 432 may advantageously be lossy processes. When the coded video data may be decoded at a video decoder (not shown in FIG. 4), the reconstructed video sequence typically may be a replica of the source video sequence with some errors. The local video decoder 433 replicates decoding processes that may be performed by the video decoder on reference frames and may cause reconstructed reference frames to be stored in the reference picture cache 434. In this manner, the encoder 203 may store copies of reconstructed reference frames locally that have common content as the reconstructed reference frames that will be obtained by a far-end video decoder (absent transmission errors).

The predictor 435 may perform prediction searches for the coding engine 432. That is, for a new frame to be coded, the predictor 435 may search the reference picture memory 434 for sample data (as candidate reference pixel blocks) or certain metadata such as reference picture motion vectors, block shapes, and so on, that may serve as an appropriate prediction reference for the new pictures. The predictor 435 may operate on a sample block-by-pixel block basis to find appropriate prediction references. In some cases, as determined by search results obtained by the predictor 435, an input picture may have prediction references drawn from multiple reference pictures stored in the reference picture memory 434.

The controller 450 may manage coding operations of the video coder 430, including, for example, setting of parameters and subgroup parameters used for encoding the video data.

Output of all aforementioned functional units may be subjected to entropy coding in the entropy coder 445. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 440 may buffer the coded video sequence(s) as created by the entropy coder 445 to prepare it for transmission via a communication channel 460, which may be a hardware/software link to a storage device which would store the encoded video data. The transmitter 440 may merge coded video data from the video coder 430 with other data to be transmitted, for example, coded audio data and/or ancillary data streams (sources not shown).

The controller 450 may manage operation of the encoder 203. During coding, the controller 450 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 203 may perform coding operations according to a predetermined video coding technology or standard, such as ITU-T Rec. H.265. In its operation, the video coder 203) may perform various compression operations, including predictive coding operations that exploit temporal and spatial redundancies in the input video sequence. The coded video data, therefore, may conform to a syntax specified by the video coding technology or standard being used.

In an embodiment, the transmitter 440 may transmit additional data with the encoded video. The video coder 4 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Before describing certain aspects of the disclosed subject matter in more detail, a few terms need to be introduced that will be referred to in the remainder of this description.

Sub-Picture henceforth refers to an, in some cases, rectangular arrangement of samples, blocks, macroblocks, coding units, or similar entities that are semantically grouped, and that may be independently coded in changed resolution. One or more sub-pictures may for a picture. One or more coded sub-pictures may form a coded picture. One or more sub-pictures may be assembled into a picture, and one or more subpictures may be extracted from a picture. In certain environments, one or more coded sub-pictures may be assembled in the compressed domain without transcoding to the sample level into a coded picture, and in the same or certain other cases, one or more coded sub-pictures may be extracted from a coded picture in the compressed domain.

Adaptive Resolution Change (ARC) henceforth refers to mechanisms that allow the change of resolution of a picture or sub-picture within a coded video sequence, by the means of, for example, reference picture resampling. ARC parameters henceforth refer to the control information required to perform adaptive resolution change, that may include, for example, filter parameters, scaling factors, resolutions of output and/or reference pictures, various control flags, and so forth.

Above description is focused on coding and decoding a single, semantically independent coded video picture. Before describing the implication of coding/decoding of multiple sub pictures with independent ARC parameters and its implied additional complexity, options for signaling ARC parameters shall be described.

Figures 5A, 5B:
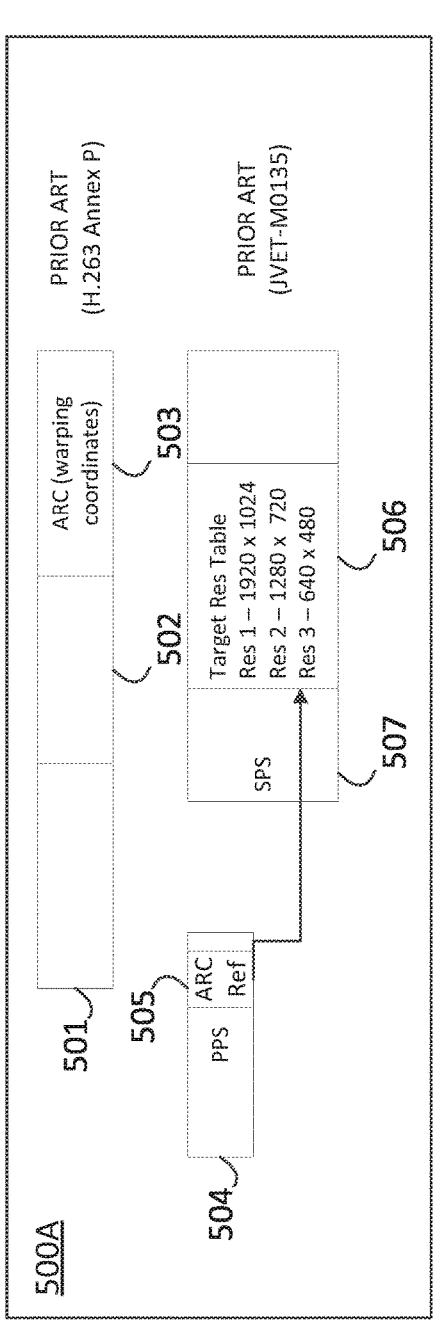
FIGS. 5A and 5B are schematic illustrations of options for signaling ARC parameters in accordance with prior art or an embodiment, as indicated.

Referring to FIG. 5, shown are several novel options for signaling ARC parameters. As noted with each of the options, they have certain advantages and certain disadvantages from a coding efficiency, complexity, and architecture viewpoint. A video coding standard or technology may choose one or more of these options, or options known from previous art, for signaling ARC parameters. The options may not be mutually exclusive, and conceivably may be interchanged based on application needs, standards technology involved, or encoder's choice.

Classes of ARC parameters may include:
up/downsample factors, separate or combined in X and Y dimension
up/downsample factors, with an addition of a temporal dimension, indicating constant speed zoom in/out for a given number of pictures Either of the above two may involve the coding of one or more presumably short syntax elements that may point into a table containing the factor(s).

resolution, in X or Y dimension, in units of samples, blocks, macroblocks, CUs, or any other suitable granularity, of the input picture, output picture, reference picture, coded picture, combined or separately. If there are more than one resolution (such as, for example, one for input picture, one for reference picture) then, in certain cases, one set of values may be inferred to from another set of values. Such could be gated, for example, by the use of flags. For a more detailed example, see below.

"warping" coordinates akin those used in H.263 Annex P, again in a suitable granularity as described above. H.263 Annex P defines one efficient way to code such warping coordinates, but other, potentially more efficient ways could conceivably also be devised. For example, the variable length reversible, "Huffman"-style coding of warping coordinates of Annex P could be replaced by a suitable length binary coding, where the length of the binary code word could, for example, be derived from a maximum picture size, possibly multiplied by a certain factor and offset by a certain value, so to allow for "warping" outside of the maximum picture size's boundaries.

up or downsample filter parameters. In the easiest case, there may be only a single filter for up and/or downsampling. However, in certain cases, it can be advantageous to allow more flexibility in filter design, and that may require to signaling of filter parameters. Such parameters may be selected through an index in a list of possible filter designs, the filter may be fully specified (for example through a list of filter coefficients, using suitable entropy coding techniques), the filter may be implicitly selected through up/downsample ratios according which in turn are signaled according to any of the mechanisms mentioned above, and so forth.

Henceforth, the description assumes the coding of a finite set of up/downsample factors (the same factor to be used in both X and Y dimension), indicated through a codeword. That codeword can advantageously be variable length coded, for example using the Ext-Golomb code common for certain syntax elements in video coding specifications such as H.264 and H.265. One suitable mapping of values to up/downsample factors can, for example, be according to the following table

| Codeword | Ext-Golomb Code | Original/Target resolution |
|---|---|---|
| 0 | 1 | 1/1 |
| 1 | 010 | 1/1.5 (upscale by 50%) |
| 2 | 011 | 1.5/1 (downscale by 50%) |
| 3 | 00100 | 1/2 (upscale by 100%) |
| 4 | 00101 | 2/1 (downscale by 100%) |

Many similar mappings could be devised according to the needs of an application and the capabilities of the up and downscale mechanisms available in a video compression technology or standard. The table could be extended to more values. Values may also be represented by entropy coding mechanisms other than Ext-Golomb codes, for example using binary coding. That may have certain advantages when the resampling factors were of interest outside the video processing engines (encoder and decoder foremost) themselves, for example by MANEs. It should be noted that, for the (presumably) most common case where no resolution change is required, an Ext-Golomb code can be chosen that is short; in the table above, only a single bit. That can have a coding efficiency advantage over using binary codes for the most common case.

The number of entries in the table, as well as their semantics may be fully or partially configurable. For example, the basic outline of the table may be conveyed in a "high" parameter set such as a sequence or decoder parameter set. Alternatively or in addition, one or more such tables may be defined in a video coding technology or standard, and may be selected through for example a decoder or sequence parameter set.

Henceforth, we describe how an upsample/downsample factor (ARC information), coded as described above, may be included in a video coding technology or standard syntax. Similar considerations may apply to one, or a few, code-words controlling up/downsample filters. See below for a discussion when comparatively large amounts of data are required for a filter or other data structures.

H.263 Annex P shown in illustration 500A includes the ARC information 502 in the form of four warping coordinates into the picture header 501, specifically in the H.263 PLUSPTYPE 503 header extension. This can be a sensible design choice when a) there is a picture header available, and b) frequent changes of the ARC information are expected. However, the overhead when using H.263-style signaling can be quite high, and scaling factors may not pertain among picture boundaries as picture header can be of transient nature.

JVCET-M135-v1, cited above, includes the ARC reference information 505 (an index) located in a picture parameter set 504, indexing a table 506 including target resolutions that in turn is located inside a sequence parameter set 507. The placement of the possible resolution in a table 506 in the sequence parameter set 507 can, according to verbal statements made by the authors, be justified by using the SPS as an interoperability negotiation point during capability exchange. Resolution can change, within the limits set by the values in the table 506 from picture to picture by referencing the appropriate picture parameter set 504.

Still referring to FIG. 5, the following additional options may exist to convey ARC information in a video bitstream. Each of those options has certain advantages over existing art as described above. The options may be simultaneously present in the same video coding technology or standard.

In an embodiment, ARC information 509, as in illustration 500B, such as a resampling (zoom) factor may be present in a slice header, GOB header, tile header, or tile group header (tile group header henceforth) 508. This can be adequate of the ARC information is small, such as a single variable length ue(v) or fixed length codeword of a few bits, for example as shown above. Having the ARC information in a tile group header directly has the additional advantage of the ARC information may be applicable to a subpicture represented by, for example, that tile group, rather than the whole picture. See also below. In addition, even if the video compression technology or standard envisions only whole picture adaptive resolution changes (in contrast to, for example, tile group based adaptive resolution changes), putting the ARC information into the tile group header vis a vis putting it into an H.263-style picture header has certain advantages from an error resilience viewpoint.

In the same or another embodiment, the ARC information 512 itself may be present in an appropriate parameter set 511 such as, for example, a picture parameter set, header parameter set, tile parameter set, adapation parameter set, and so forth (Adapation parameter set depicted). The scope of that parameter set can advantageously be no larger than a picture, for example a tile group. The use of the ARC information is implicit through the activation of the relevant parameter set. For example, when a video coding technology or standard contemplates only picture-based ARC, then a picture parameter set or equivalent may be appropriate.

in the same or another embodiment, ARC reference information 513 may be present in a Tile Group header 514 or a similar data structure. That reference information 513 can refer to a subset of ARC information 515 available in a parameter set 516 with a scope beyond a single picture, for example a sequence parameter set, or decoder parameter set.

The additional level of indirection implied activation of a PPS from a tile group header, PPS, SPS, as used in JVET-M0135-v1 appears to be unnecessary, as picture parameter sets, just as sequence parameter sets, can (and have in certain standards such as RFC3984) be used for capability negotiation or announcements. If, however, the ARC information should be applicable to a subpicture represented, for example, by a tile groups also, a parameter set with an activation scope limited to a tile group, such as the Adaptation Parameter set or a Header Parameter Set may be the better choice. Also, if the ARC information is of more than negligible size—for example contains filter control information such as numerous filter coefficients—then a parameter may be a better choice than using a header 508 directly from a coding efficiency viewpoint, as those settings may be reusable by future pictures or sub-pictures by referencing the same parameter set.

When using the sequence parameter set or another higher parameter set with a scope spanning multiple pictures, certain considerations may apply:

1. The parameter set to store the ARC information table 516 can, in some cases, be the sequence parameter set, but in other cases advantageously the decoder parameter set. The decoder parameter set can have an activation scope of multiple CVSs, namely the coded video stream, i.e. all coded video bits from session start until session teardown. Such a scope may be more appropriate because possible ARC factors may be a decoder feature, possibly implemented in hardware, and hardware features tend not to change with any CVS (which in at least some entertainment systems is a Group of Pictures, one second or less in length). That said, putting the table into the sequence parameter set is expressly included in the placement options described herein, in particular in conjunction with point 2 below.

2. The ARC reference information 513 may advantageously be placed directly into the picture/slice tile/GOB/tile group header (tile group header henceforth) 514 rather than into the picture parameter set as in JVCET-M0135-v1, The reason is as follows: when an encoder wants to change a single value in a picture parameter set, such as for example the ARC reference information, then it has to create a new PPS and reference that new PPS. Assume that only the ARC reference information changes, but other information such as, for example, the quantization matrix information in the PPS stays. Such information can be of substantial size, and would need to be retransmitted to make the new PPS complete. As the ARC reference information may be a single codeword, such as the index into the table 513 and that would be the only value that changes, it would be cumbersome and wasteful to retransmit all the, for example, quantization matrix information. Insofar, can be considerably better from a coding efficiency viewpoint to avoid the indirection through the PPS, as proposed in JVET-M0135-v1. Similarly, putting the ARC reference information into the PPS has the additional disadvantage that the ARC information referenced by the ARC reference information 513 necessarily needs to apply to the whole picture and not to a sub-picture, as the scope of a picture parameter set activation is a picture.

In the same or another embodiment, the signaling of ARC parameters can follow a detailed example as outlined in FIG. 6. FIG. 6 depicts syntax diagrams 600 in a representation as used in video coding standards since at least 1993. The notation of such syntax diagrams roughly follows C-style programming Lines in boldface indicate syntax elements present in the bitstream, lines without boldface often indicate control flow or the setting of variables.

A tile group header 601 as an exemplary syntax structure of a header applicable to a (possibly rectangular) part of a picture can conditionally contain, a variable length, Exp-Golomb coded syntax element dec_pic_size_idx 602 (depicted in boldface). The presence of this syntax element in the tile group header can be gated on the use of adaptive resolution 603—here, the value of a flag not depicted in boldface, which means that flag is present in the bitstream at the point where it occurs in the syntax diagram. Whether or not adaptive resolution is in use for this picture or parts thereof can be signaled in any high level syntax structure inside or outside the bitstream. In the example shown, it is signaled in the sequence parameter set as outlined below.

Still referring to FIG. 6, shown is also an excerpt of a sequence parameter set 610. The first syntax element shown is adaptive_pic_resolution_change flag 611. When true, that flag can indicate the use of adaptive resolution which, in turn may require certain control information. In the example, such control information is conditionally present based on the value of the flag based on the if( ) statement in the parameter set 612 and the tile group header 601.

When adaptive resolution is in use, in this example, coded is an output resolution in units of samples 613. The numeral 613 refers to both output_pic_width_in_luma_samples and output_pic_height_in_luma_samples, which together can define the resolution of the output picture. Elsewhere in a video coding technology or standard, certain restrictions to either value can be defined. For example, a level definition may limit the number of total output samples, which could be the product of the value of those two syntax elements. Also, certain video coding technologies or standards, or external technologies or standards such as, for example, system standards, may limit the numbering range (for example, one or both dimensions must be divisible by a power of 2 number), or the aspect ratio (for example, the width and height must be in a relation such as 4:3 or 16:9). Such restrictions may be introduced to facilitate hardware implementations or for other reasons, and are well known in the art.

In certain applications, it can be advisable that the encoder instructs the decoder to use a certain reference picture size rather than implicitly assume that size to be the output picture size. In this example, the syntax element reference_pic_size_present_flag 614 gates the conditional presence of reference picture dimensions 615 (again, the numeral refers to both width and height).

Finally, shown is a table of possible decoding picture width and heights. Such a table can be expressed, for example, by a table indication (num_dec_pic_size_in_luma_samples_minus1) 616. The "minus1" can refer to the interpretation of the value of that syntax element. For example, if the coded value is zero, one table entry is present. If the value is five, six table entries are present. For each "line" in the table, decoded picture width and height are then included in the syntax 617.

The table entries presented 617 can be indexed using the syntax element dec_pic_size_idx 602 in the tile group header, thereby allowing different decoded sizes—in effect, zoom factors—per tile group.

Certain video coding technologies or standards, for example VP9, support spatial scalability by implementing certain forms of reference picture resampling (signaled quite differently from the disclosed subject matter) in conjunction with temporal scalability, so to enable spatial scalability. In particular, certain reference pictures may be upsampled using ARC-style technologies to a higher resolution to form the base of a spatial enhancement layer. Those upsampled pictures could be refined, using normal prediction mechanisms at the high resolution, so to add detail.

The disclosed subject matter can be used in such an environment. In certain cases, in the same or another embodiment, a value in the NAL unit header, for example the Temporal ID field, can be used to indicate not only the temporal but also the spatial layer. Doing so has certain advantages for certain system designs; for example, existing Selected Forwarding Units (SFU) created and optimized for temporal layer selected forwarding based on the NAL unit header Temporal ID value can be used without modification, for scalable environments. In order to enable that, there may be a requirement for a mapping between the coded picture size and the temporal layer is indicated by the temporal ID field in the NAL unit header.

In some video coding technologies, an Access Unit (AU) can refer to coded picture(s), slice(s), tile(s), NAL Unit(s), and so forth, that were captured and composed into a the respective picture/slice/tile/NAL unit bitstream at a given instance in time. That instance in time can be the composition time.

In HEVC, and certain other video coding technologies, a picture order count (POC) value can be used for indicating a selected reference picture among multiple reference picture stored in a decoded picture buffer (DPB). When an access unit (AU) comprises one or more pictures, slices, or tiles, each picture, slice, or tile belonging to the same AU may carry the same POC value, from which it can be derived that they were created from content of the same composition time. In other words, in a scenario where two pictures/slices/tiles carry the same given POC value, that can be indicative of the two picture/slice/tile belonging to the same AU and having the same composition time. Conversely, two pictures/tiles/slices having different POC values can indicate those pictures/slices/tiles belonging to different AUs and having different composition times.

In an embodiment of the disclosed subject matter, aforementioned rigid relationship can be relaxed in that an access unit can comprise pictures, slices, or tiles with different POC values. By allowing different POC values within an AU, it becomes possible to use the POC value to identify potentially independently decodable pictures/slices/tiles with identical presentation time. That, in turn, can enable support of multiple scalable layers without a change of reference picture selection signaling (e.g. reference picture set signaling or reference picture list signaling), as described in more detail below.

It is, however, still desirable to be able to identify the AU that a picture/slice/tile belongs to, with respect to other picture/slices/tiles having different POC values, from the POC value alone. This can be achieved, as described below.

In the same or other embodiments, an access unit count (AUC) may be signaled in a high-level syntax structure, such as NAL unit header, slice header, tile group header, SEI message, parameter set or AU delimiter. The value of AUC may be used to identify which NAL units, pictures, slices, or tiles belong to a given AU. The value of AUC may be corresponding to a distinct composition time instance. The AUC value may be equal to a multiple of the POC value. By dividing the POC value by an integer value, the AUC value may be calculated. In certain cases, division operations can place a certain burden on decoder implementations. In such cases, small restrictions in the numbering space of the AUC values may allow to substitute the division operation by shift operations. For example, the AUC value may be equal to a Most Significant Bit (MSB) value of the POC value range.

In the same embodiment, a value of POC cycle per AU (poc_cycle_au) may be signaled in a high-level syntax structure, such as NAL unit header, slice header, tile group header, SEI message, parameter set or AU delimiter. The poc_cycle_au may indicate how many different and consecutive POC values can be associated with the same AU. For example, if the value of poc_cycle_au is equal to 4, the pictures, slices or tiles with the POC value equal to 0-3, inclusive, are associated with the AU with AUC value equal to 0, and the pictures, slices or tiles with POC value equal to 4-7, inclusive, are associated with the AU with AUC value equal to 1. Hence, the value of AUC may be inferred by dividing the POC value by the value of poc_cycle_au.

In the same or another embodiment, the value of poc_cyle_au may be derived from information, located for example in the video parameter set (VPS), that identifies the number of spatial or SNR layers in a coded video sequence. Such a possible relationship is briefly described below. While the derivation as described above may save a few bits in the VPS and hence may improves coding efficiency, it can be advantageous to explicitly code poc_cycle_au in an appropriate high level syntax structure hierarchically below the video parameter set, so to be able to minimize poc_cycle_au for a given small part of a bitstream such as a picture. This optimization may save more bits than can be saved through the derivation process above because POC values (and/or values of syntax elements indirectly referring to POC) may be coded in low level syntax structures.

Figure 10:
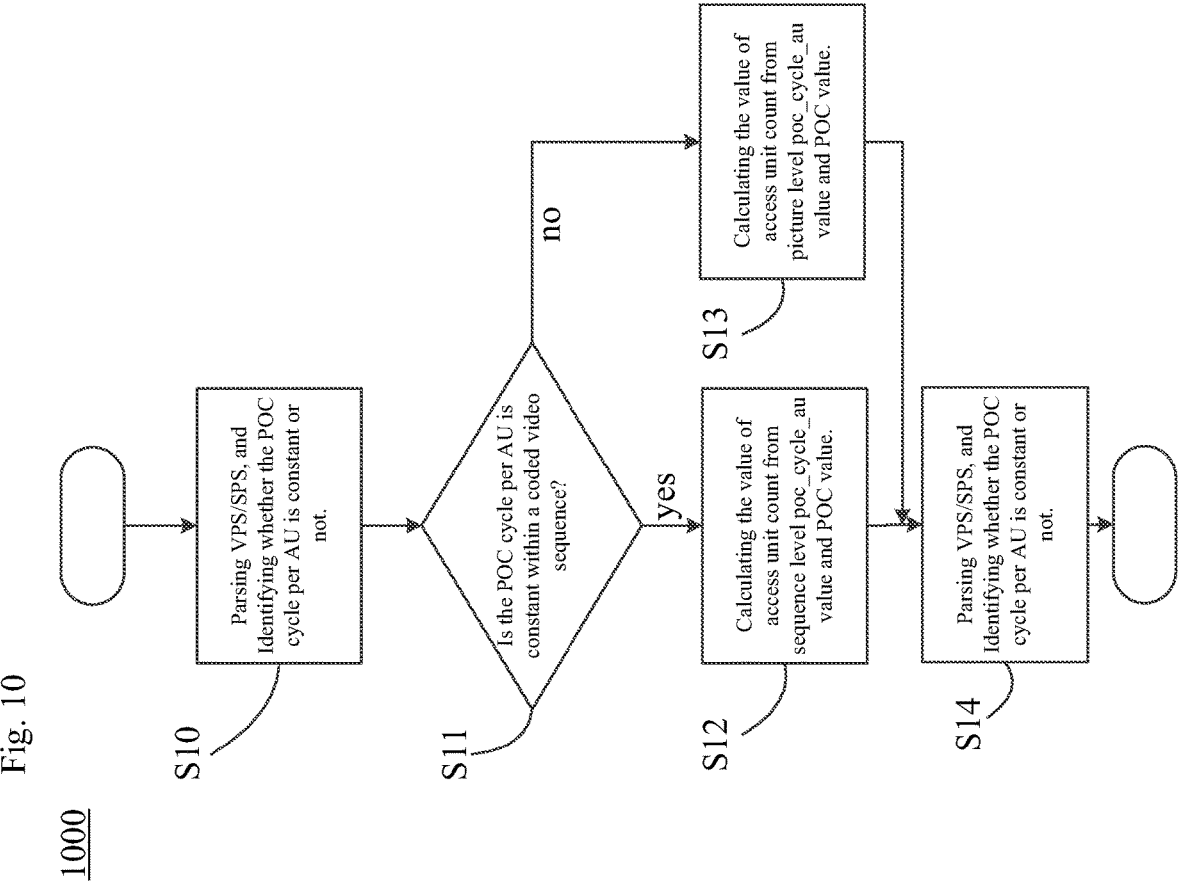
FIG. 10 is a schematic illustration of a simplified block diagram of parsing and decoding picture order count (POC) cycle per access unit and access unit count value.

In the same or another embodiment, FIG. 9 shows an example of syntax tables 900 to signal the syntax element of vps_poc_cycle_au in VPS (or SPS), which indicates the poc_cycle_au used for all picture/slices in a coded video sequence, and the syntax element of slice_poc_cycle_au, which indicates the poc_cycle_au of the current slice, in slice header. If the POC value increases uniformly per AU, vps_contant_poc_cycle_per_au in VPS is set equal to 1 and vps_poc_cycle_au is signaled in VPS. In this case, slice_poc_cycle_au is not explicitly signaled, and the value of AUC for each AU is calculated by dividing the value of POC by vps_poc_cycle_au. If the POC value does not increase uniformly per AU, vps_contant_poc_cycle_per_au in VPS is set equal to 0. In this case, vps_access_unit_cnt is not signaled, while slice_access_unit_cnt is signaled in slice header for each slice or picture. Each slice or picture may have a different value of slice_access_unit_cnt. The value of AUC for each AU is calculated by dividing the value of POC by slice_poc_cycle_au. FIG. 10 shows a block diagram illustrating the relevant work flow 1000.

At S10, there is considered parsing VPS/SPS, and identifying whether one or more POC cycle per AU is constant. At S11, it is determined whether the POC cycle per AU is constant within a coded video sequence, and if not, at S13, there is calculating of the value of access unit count from a picture level poc_cycle_au_value and a POC value, and if so, at S12 there is calculating of the value of access unit count from a sequence level poc_cycle_au_value and a POC value. At S14, there is parsing VPS/SPS and identifying of whether the POC cycle per AU is constant or not which may begin again such steps described above or proceed on to alternate processing.

In the same or other embodiments, even though the value of POC of a picture, slice, or tile may be different, the picture, slice, or tile corresponding to an AU with the same AUC value may be associated with the same decoding or output time instance. Hence, without any inter-parsing/decoding dependency across pictures, slices or tiles in the same AU, all or subset of pictures, slices or tiles associated with the same AU may be decoded in parallel, and may be outputted at the same time instance.

In the same or other embodiments, even though the value of POC of a picture, slice, or tile may be different, the picture, slice, or tile corresponding to an AU with the same AUC value may be associated with the same composition/display time instance. When the composition time is contained in a container format, even though pictures correspond to different AUs, if the pictures have the same composition time, the pictures can be displayed at the same time instance.

In the same or other embodiments, each picture, slice, or tile may have the same temporal identifier (temporal_id) in the same AU. All or subset of pictures, slices or tiles corresponding to a time instance may be associated with the same temporal sub-layer. In the same or other embodiments, each picture, slice, or tile may have the same or a different spatial layer id (layer_id) in the same AU. All or subset of pictures, slices or tiles corresponding to a time instance may be associated with the same or a different spatial layer.

Figure 8:
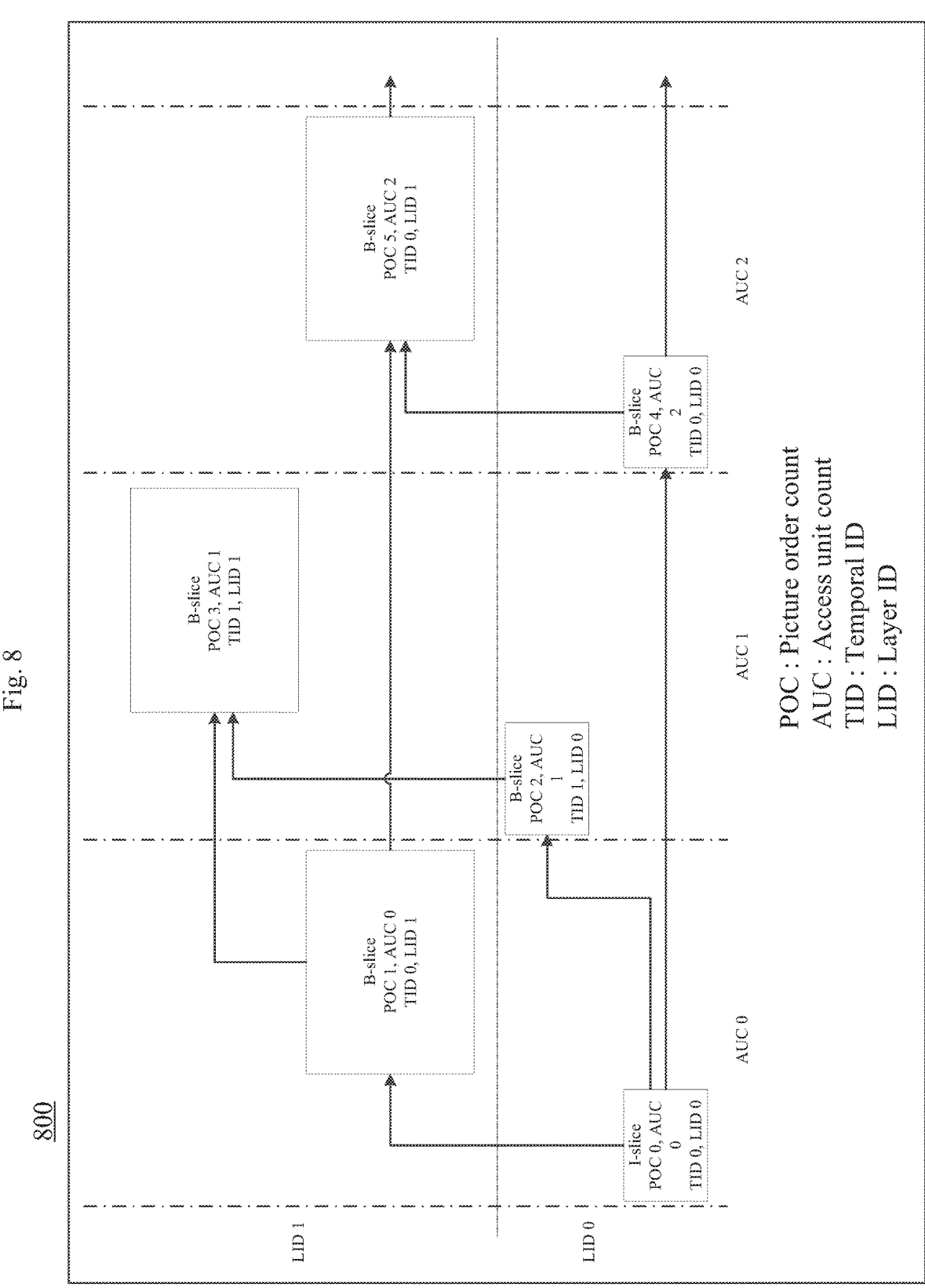
FIG. 8 is an example of prediction structure for scalability with adaptive resolution change.

FIG. 8 shows an example of a video sequence structure with combination of temporal_id, layer_id, POC and AUC values with adaptive resolution change. In this example, a picture, slice or tile in the first AU with AUC=0 may have temporal_id=0 and layer_id=0 or 1, while a picture, slice or tile in the second AU with AUC=1 may have temporal_id=1 and layer_id=0 or 1, respectively. The value of POC is increased by 1 per picture regardless of the values of temporal_id and layer_id. In this example, the value of poc_cycle_au can be equal to 2. Preferably, the value of poc_cycle_au may be set equal to the number of (spatial scalability) layers. In this example, hence, the value of POC is increased by 2, while the value of AUC is increased by 1.

In the above embodiments, all or sub-set of inter-picture or inter-layer prediction structure and reference picture indication may be supported by using the existing reference picture set (RPS) signaling in HEVC or the reference picture list (RPL) signaling. In RPS or RPL, the selected reference picture is indicated by signaling the value of POC or the delta value of POC between the current picture and the selected reference picture. For the disclosed subject matter, the RPS and RPL can be used to indicate the inter-picture or inter-layer prediction structure without change of signaling, but with the following restrictions. If the value of temporal_id of a reference picture is greater than the value of temporal_id current picture, the current picture may not use the reference picture for motion compensation or other predictions. If the value of layer_id of a reference picture is greater than the value of layer_id current picture, the current picture may not use the reference picture for motion compensation or other predictions.

In the same and other embodiments, the motion vector scaling based on POC difference for temporal motion vector prediction may be disabled across multiple pictures within an access unit. Hence, although each picture may have a different POC value within an access unit, the motion vector is not scaled and used for temporal motion vector prediction within an access unit. This is because a reference picture with a different POC in the same AU is considered a reference picture having the same time instance. Therefore, in the embodiment, the motion vector scaling function may return 1, when the reference picture belongs to the AU associated with the current picture.

In the same and other embodiments, the motion vector scaling based on POC difference for temporal motion vector prediction may be optionally disabled across multiple pictures, when the spatial resolution of the reference picture is different from the spatial resolution of the current picture. When the motion vector scaling is allowed, the motion vector is scaled based on both POC difference and the spatial resolution ratio between the current picture and the reference picture.

In the same or another embodiment, the motion vector may be scaled based on AUC difference instead of POC difference, for temporal motion vector prediction, especially when the poc_cycle_au has non-uniform value (when vps_contant_poc_cycle_per_au==0). Otherwise (when vps_contant_poc_cycle_per_au==1), the motion vector scaling based on AUC difference may be identical to the motion vector scaling based on POC difference.

In the same or another embodiment, when the motion vector is scaled based on AUC difference, the reference motion vector in the same AU (with the same AUC value) with the current picture is not scaled based on AUC difference and used for motion vector prediction without scaling or with scaling based on spatial resolution ratio between the current picture and the reference picture.

In the same and other embodiments, the AUC value is used for identifying the boundary of AU and used for hypothetical reference decoder (HRD) operation, which needs input and output timing with AU granularity. In most cases, the decoded picture with the highest layer in an AU may be outputted for display. The AUC value and the layer id value can be used for identifying the output picture.

In an embodiment, a picture may consist of one or more sub-pictures. Each sub-picture may cover a local region or the entire region of the picture. The region supported by a sub-picture may or may not be overlapped with the region supported by another sub-picture. The region composed by one or more sub-pictures may or may not cover the entire region of a picture. If a picture consists of a sub-picture, the region supported by the sub-picture is identical to the region supported by the picture.

In the same embodiment, a sub-picture may be coded by a coding method similar to the coding method used for the coded picture. A sub-picture may be independently coded or may be coded dependent on another sub-picture or a coded picture. A sub-picture may or may not have any parsing dependency from another sub-picture or a coded picture.

In the same embodiment, a coded sub-picture may be contained in one or more layers. A coded sub-picture in a layer may have a different spatial resolution. The original sub-picture may be spatially re-sampled (up-sampled or down-sampled), coded with different spatial resolution parameters, and contained in a bitstream corresponding to a layer.

In the same or another embodiment, a sub-picture with (W,H), where W indicates the width of the sub-picture and H indicates the height of the sub-picture, respectively, may be coded and contained in the coded bitstream corresponding to layer 0, while the up-sampled (or down-sampled) sub-picture from the sub-picture with the original spatial resolution, with $(W*S_{w,k}, H*S_{h,k})$, may be coded and contained in the coded bitstream corresponding to layer k, where $S_{w,k}, S_{h,k}$ indicate the resampling ratios, horizontally and vertically. If the values of $S_{w,k}, S_{h,k}$ are greater than 1, the resampling is equal to the up-sampling. Whereas, if the values of $S_{w,k}, S_{h,k}$ are smaller than 1, the resampling is equal to the down-sampling.

In the same or another embodiment, a coded sub-picture in a layer may have a different visual quality from that of the coded sub-picture in another layer in the same sub-picture or different subpicture. For example, sub-picture i in a layer, n, is coded with the quantization parameter, $Q_{i,n}$, while a sub-picture j in a layer, m, is coded with the quantization parameter, $Q_{j,m}$.

In the same or another embodiment, a coded sub-picture in a layer may be independently decodable, without any parsing or decoding dependency from a coded sub-picture in another layer of the same local region. The sub-picture layer, which can be independently decodable without referencing another sub-picture layer of the same local region, is the independent sub-picture layer. A coded sub-picture in the independent sub-picture layer may or may not have a decoding or parsing dependency from a previously coded sub-picture in the same sub-picture layer, but the coded sub-picture may not have any dependency from a coded picture in another sub-picture layer.

In the same or another embodiment, a coded sub-picture in a layer may be dependently decodable, with any parsing or decoding dependency from a coded sub-picture in another layer of the same local region. The sub-picture layer, which can be dependently decodable with referencing another sub-picture layer of the same local region, is the dependent sub-picture layer. A coded sub-picture in the dependent sub-picture may reference a coded sub-picture belonging to the same sub-picture, a previously coded sub-picture in the same sub-picture layer, or both reference sub-pictures.

In the same or another embodiment, a coded sub-picture consists of one or more independent sub-picture layers and one or more dependent sub-picture layers. However, at least one independent sub-picture layer may be present for a coded sub-picture. The independent sub-picture layer may have the value of the layer identifier (layer_id), which may be present in NAL unit header or another high-level syntax structure, equal to 0. The sub-picture layer with the layer_id equal to 0 is the base sub-picture layer.

In the same or another embodiment, a picture may consist of one or more foreground sub-pictures and one background sub-picture. The region supported by a background sub-picture may be equal to the region of the picture. The region supported by a foreground sub-picture may be overlapped with the region supported by a background sub-picture. The background sub-picture may be a base sub-picture layer, while the foreground sub-picture may be a non-base (enhancement) sub-picture layer. One or more non-base sub-picture layer may reference the same base layer for decoding. Each non-base sub-picture layer with layer_id equal to a may reference a non-base sub-picture layer with layer_id equal to b, where a is greater than b.

In the same or another embodiment, a picture may consist of one or more foreground sub-pictures with or without a background sub-picture. Each sub-picture may have its own base sub-picture layer and one or more non-base (enhancement) layers. Each base sub-picture layer may be referenced by one or more non-base sub-picture layers. Each non-base sub-picture layer with layer_id equal to a may reference a non-base sub-picture layer with layer_id equal to b, where a is greater than b.

In the same or another embodiment, a picture may consist of one or more foreground sub-pictures with or without a background sub-picture. Each coded sub-picture in a (base or non-base) sub-picture layer may be referenced by one or more non-base layer sub-pictures belonging to the same sub-picture and one or more non-base layer sub-pictures, which are not belonging to the same sub-picture.

In the same or another embodiment, a picture may consist of one or more foreground sub-pictures with or without a background sub-picture. A sub-picture in a layer a may be further partitioned into multiple sub-pictures in the same layer. One or more coded sub-pictures in a layer b may reference the partitioned sub-picture in a layer a.

In the same or another embodiment, a coded video sequence (CVS) may be a group of the coded pictures. The CVS may consist of one or more coded sub-picture sequences (CSPS), where the CSPS may be a group of coded sub-pictures covering the same local region of the picture. A CSPS may have the same or a different temporal resolution than that of the coded video sequence.

In the same or another embodiment, a CSPS may be coded and contained in one or more layers. A CSPS may consist of one or more CSPS layers. Decoding one or more CSPS layers corresponding to a CSPS may reconstruct a sequence of sub-pictures corresponding to the same local region.

In the same or another embodiment, the number of CSPS layers corresponding to a CSPS may be identical to or different from the number of CSPS layers corresponding to another CSPS.

In the same or another embodiment, a CSPS layer may have a different temporal resolution (e.g. frame rate) from another CSPS layer. The original (uncompressed) sub-picture sequence may be temporally re-sampled (up-sampled or down-sampled), coded with different temporal resolution parameters, and contained in a bitstream corresponding to a layer.

In the same or another embodiment, a sub-picture sequence with the frame rate, F, may be coded and contained in the coded bitstream corresponding to layer 0, while the temporally up-sampled (or down-sampled) sub-picture sequence from the original sub-picture sequence, with $F*S_{t,k}$, may be coded and contained in the coded bitstream corresponding to layer k, where $S_{t,k}$ indicates the temporal sampling ratio for layer k. If the value of $S_{t,k}$ is greater than 1, the temporal resampling process is equal to the frame rate up conversion. Whereas, if the value of $S_{t,k}$ is smaller than 1, the temporal resampling process is equal to the frame rate down conversion.

In the same or another embodiment, when a sub-picture with a CSPS layer a is reference by a sub-picture with a CSPS layer b for motion compensation or any inter-layer prediction, if the spatial resolution of the CSPS layer a is different from the spatial resolution of the CSPS layer b, decoded pixels in the CSPS layer a are resampled and used for reference. The resampling process may need an up-sampling filtering or a down-sampling filtering.

Figure 11:
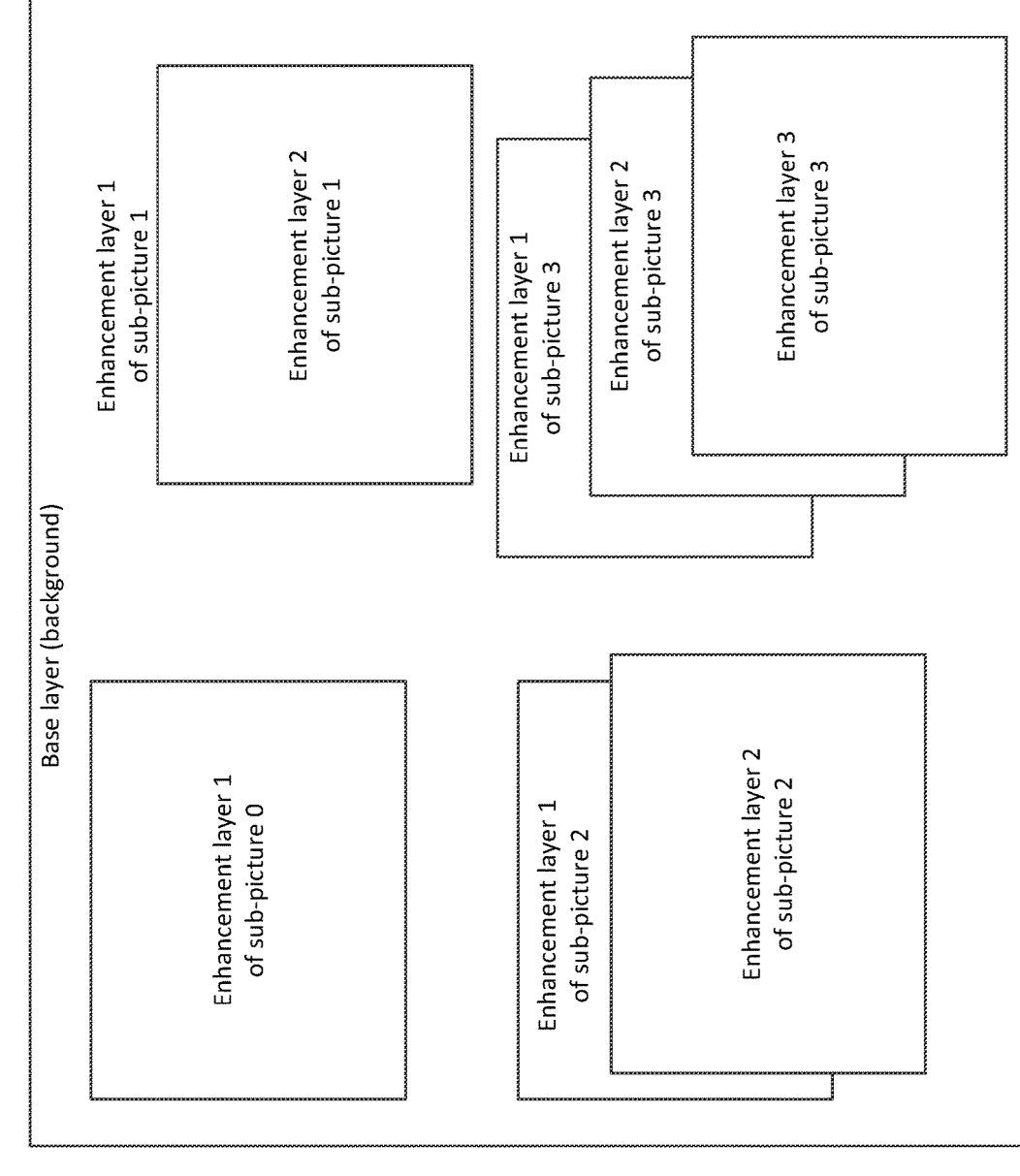
FIG. 11 is a schematic illustration of a video bitstream structure comprising multi-layered sub-pictures.

FIG. 11 shows an example 1100 with respect to a video bitstream including a background video CSPS with layer_id equal to 0 and multiple foreground CSPS layers. While a coded sub-picture may consist of one or more CSPS layers, a background region, which does not belong to any foreground CSPS layer, may consist of a base layer. The base layer may contain a background region and foreground regions, while an enhancement CSPS layer contain a foreground region. An enhancement CSPS layer may have a better visual quality than the base layer, at the same region. The enhancement CSPS layer may reference the reconstructed pixels and the motion vectors of the base layer, corresponding to the same region.

In the same or another embodiment, the video bitstream corresponding to a base layer is contained in a track, while the CSPS layers corresponding to each sub-picture are contained in a separated track, in a video file.

In the same or another embodiment, the video bitstream corresponding to a base layer is contained in a track, while CSPS layers with the same layer_id are contained in a separated track. In this example, a track corresponding to a layer k includes CSPS layers corresponding to the layer k, only.

In the same or another embodiment, each CSPS layer of each sub-picture is stored in a separate track. Each trach may or may not have any parsing or decoding dependency from one or more other tracks.

In the same or another embodiment, each track may contain bitstreams corresponding to layer i to layer j of CSPS layers of all or a subset of sub-pictures, where $0<i=<j=<k$, k being the highest layer of CSPS.

In the same or another embodiment, a picture consists of one or more associated media data including depth map, alpha map, 3D geometry data, occupancy map, etc. Such associated timed media data can be divided to one or multiple data sub-stream each of which corresponding to one sub-picture.

Figure 12:
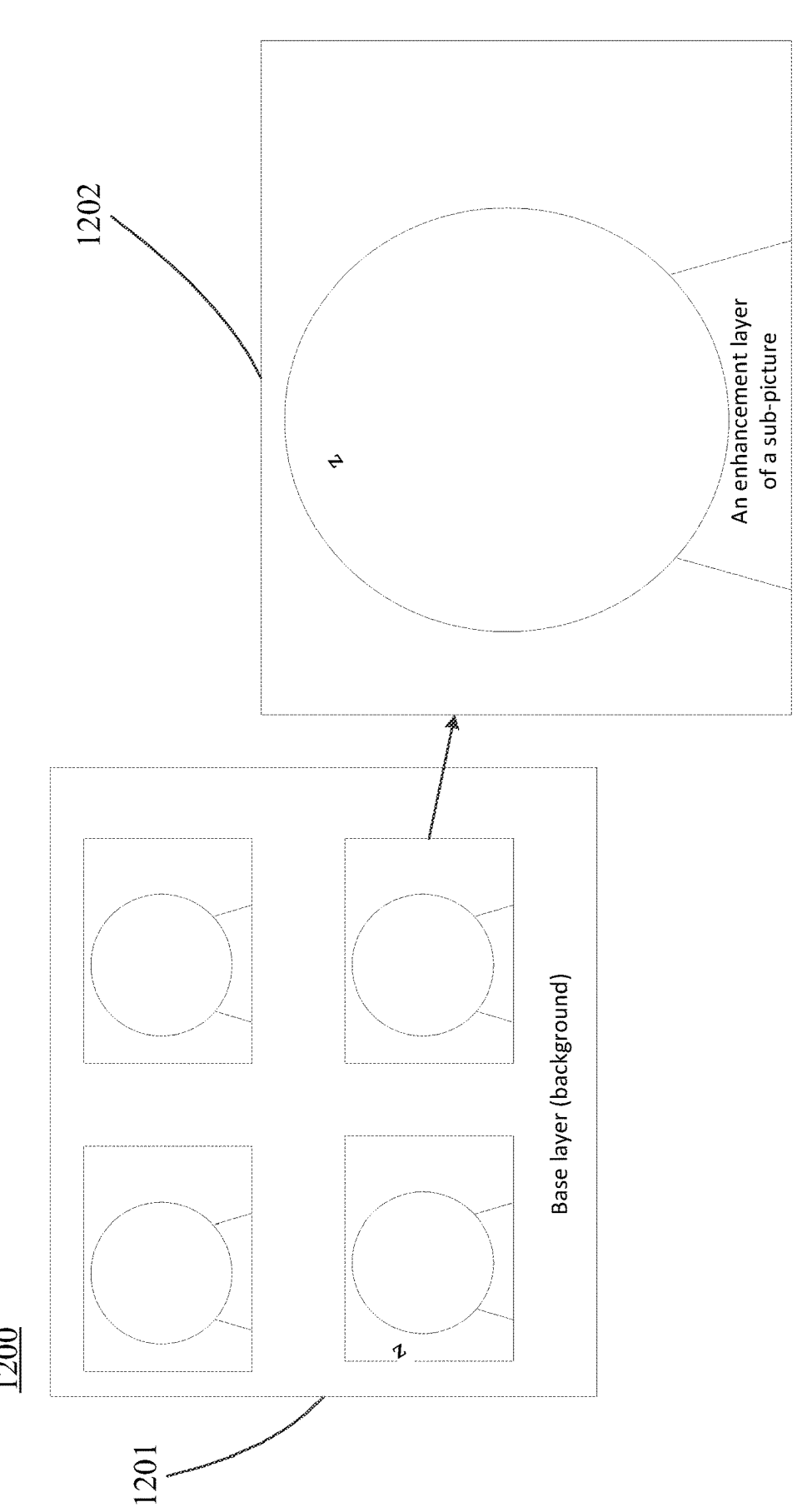
FIG. 12 is a schematic illustration of a display of the selected sub-picture with an enhanced resolution.
Figure 13:
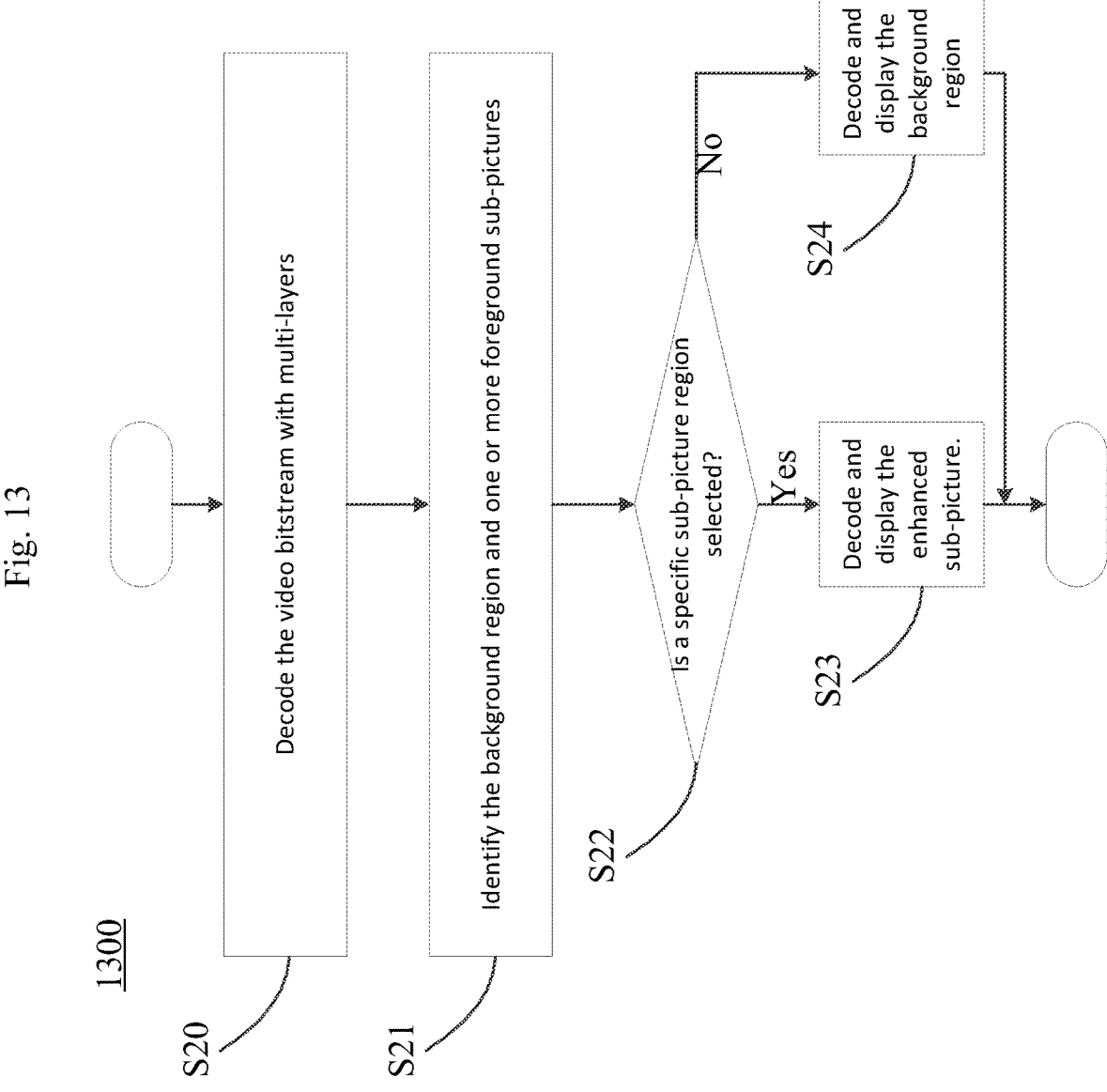
FIG. 13 is a block diagram of the decoding and display process for a video bitstream comprising multi-layered sub-pictures.

In the same or another embodiment, FIG. 12 shows an example 1200 of video conference based on the multi-layered sub-picture method. In a video stream, one base layer video bitstream 1201 corresponding to the background picture and one or more enhancement layer video bitstreams 1202 corresponding to foreground sub-pictures are contained. Each enhancement layer video bitstream 1202 is corresponding to a CSPS layer. In a display, the picture corresponding to the base layer is displayed by default. It contains one or more user's picture in a picture (PIP). When a specific user is selected by a client's control, the enhancement CSPS layer 1202 corresponding to the selected user is decoded and displayed with the enhanced quality or spatial resolution. FIG. 13 shows the diagram 1300 for the operation.

At S20, there is a decoding of video bitstream with multi-layers, and at S21 there is an identifying of a background region and one or more foreground sub-pictures. At S22, there is considered whether a specific sub-picture region is selected, and if not, at S24, there is decoded and displayed the background region, and if so, at S23, there is decoded and displayed the enhanced sub-picture.

In the same or another embodiment, a network middle box (such as router) may select a subset of layers to send to a user depending on its bandwidth. The picture/subpicture organization may be used for bandwidth adaptation. For instance, if the user doesn't have the bandwidth, the router strips of layers or selects some subpictures due to their importance or based on used setup and this can be done dynamically to adopt to bandwidth.

FIG. 14 shows a use case of 360 video 1400. When a spherical 360 picture 1401 is projected onto a planar picture, the projection 360 picture may be partitioned into multiple sub-pictures as a base layer 1402. An enhancement layer 1403 of a specific sub-picture may be coded and transmitted to a client. A decoder may be able to decode both the base layer including all sub-pictures and an enhancement layer of a selected sub-picture. When the current viewport is identical to the selected sub-picture, the displayed picture may have a higher quality with the decoded sub-picture with the enhancement layer. Otherwise, the decoded picture with the base layer can be displayed, with a low quality.

In the same or another embodiment, any layout information for display may be present in a file, as supplementary information (such as SEI message or metadata). One or more decoded sub-pictures may be relocated and displayed depending on the signaled layout information. The layout information may be signaled by a streaming server or a broadcaster, or may be regenerated by a network entity or a cloud server, or may be determined by a user's customized setting.

Figure 15:
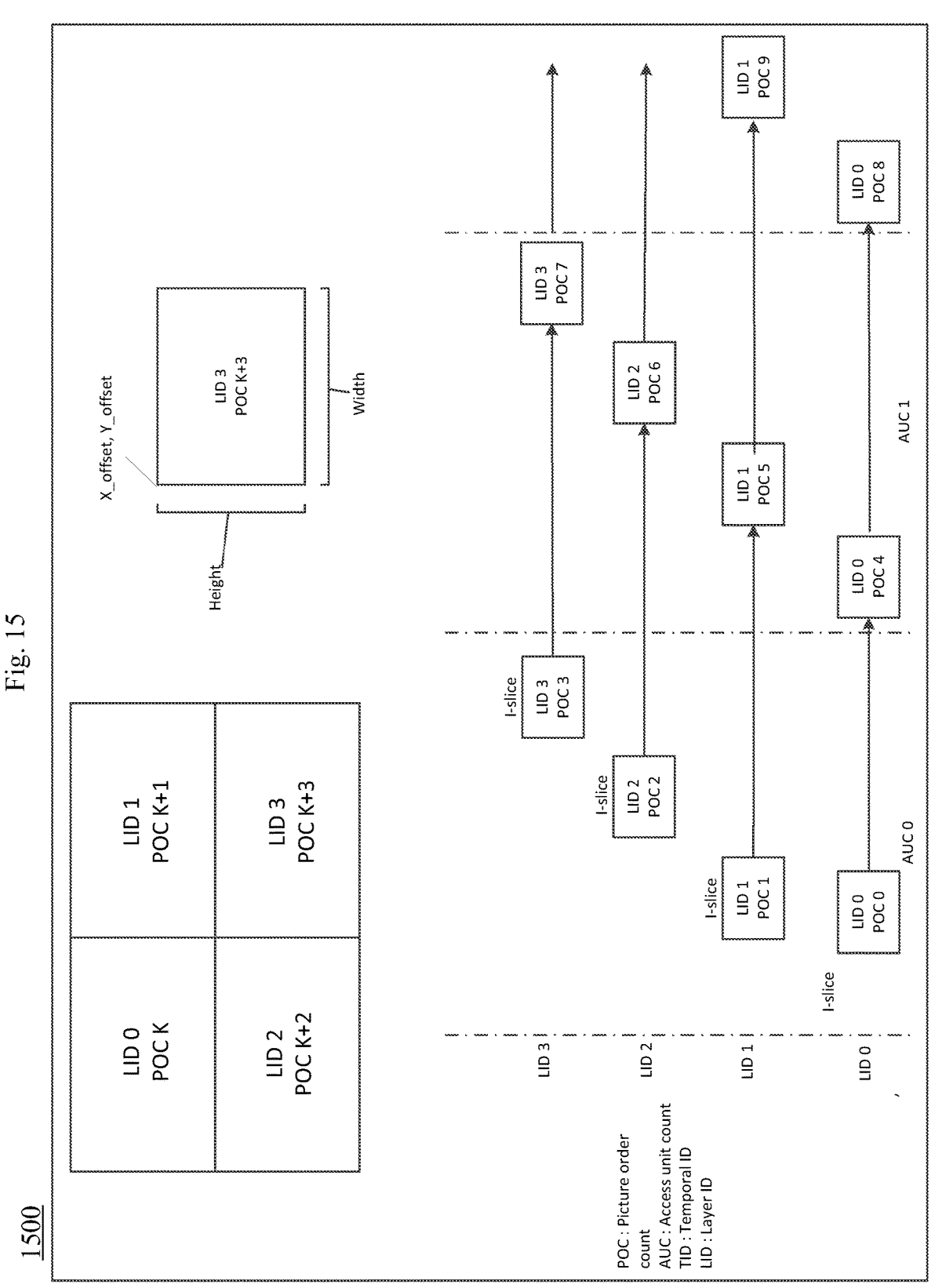
FIG. 15 is an example of a layout information of sub-pictures and its corresponding layer and picture prediction structure.

In an embodiment, when an input picture is divided into one or more (rectangular) sub-region(s), each sub-region may be coded as an independent layer. Each independent layer corresponding to a local region may have a unique layer_id value. For each independent layer, the sub-picture size and location information may be signaled. For example, picture size (width, height), the offset information of the left-top corner (x_offset, y_offset). FIG. 15 shows an example 1500 of the layout of divided sub-pictures, its sub-picture size and position information and its corresponding picture prediction structure. The layout information including the sub-picture size(s) and the sub-picture position(s) may be signaled in a high-level syntax structure, such as parameter set(s), header of slice or tile group, or SEI message.

In the same embodiment, each sub-picture corresponding to an independent layer may have its unique POC value within an AU. When a reference picture among pictures stored in DPB is indicated by using syntax element(s) in RPS or RPL structure, the POC value(s) of each sub-picture corresponding to a layer may be used.

In the same or another embodiment, in order to indicate the (inter-layer) prediction structure, the layer_id may not be used and the POC (delta) value may be used.

In the same embodiment, a sub-picture with a POC vale equal to N corresponding to a layer (or a local region) may or may not be used as a reference picture of a sub-picture with a POC value equal to N+K, corresponding to the same layer (or the same local region) for motion compensated prediction. In most cases, the value of the number K may be equal to the maximum number of (independent) layers, which may be identical to the number of sub-regions.

Figure 16:
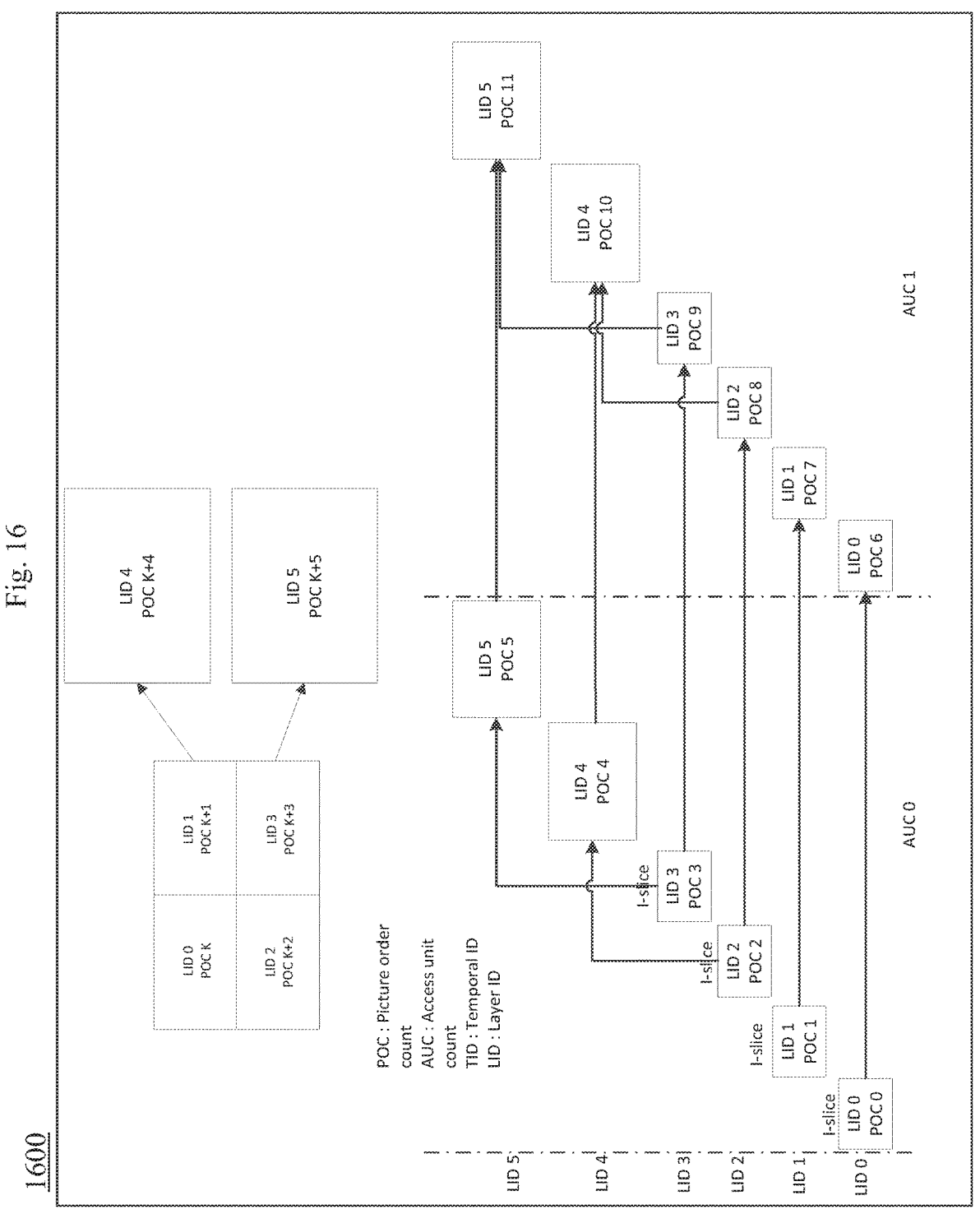
FIG. 16 is an example of a layout information of sub-pictures and its corresponding layer and picture prediction structure, with spatial scalability modality of local region.

In the same or another embodiment, FIG. 16 shows the extended case of FIG. 15. When an input picture is divided into multiple (e.g. four) sub-regions, each local region may be coded with one or more layers. In the case, the number of independent layers may be equal to the number of sub-regions, and one or more layers may correspond to a sub-region. Thus, each sub-region may be coded with one or more independent layer(s) and zero or more dependent layer(s).

In the same embodiment, in FIG. 16, an example illustration 1600 is shown in which the input picture may be divided into four sub-regions. The right-top sub-region may be coded as two layers, which are layer 1 and layer 4, while the right-bottom sub-region may be coded as two layers, which are layer 3 and layer 5. In this case, the layer 4 may reference the layer 1 for motion compensated prediction, while the layer 5 may reference the layer 3 for motion compensation.

In the same or another embodiment, in-loop filtering (such as deblocking filtering, adaptive in-loop filtering, reshaper, bilateral filtering or any deep-learning based filtering) across layer boundary may be (optionally) disabled.

In the same or another embodiment, motion compensated prediction or intra-block copy across layer boundary may be (optionally) disabled.

In the same or another embodiment, boundary padding for motion compensated prediction or in-loop filtering at the boundary of sub-picture may be processed optionally. A flag indicating whether the boundary padding is processed or not may be signaled in a high-level syntax structure, such as parameter set(s) (VPS, SPS, PPS, or APS), slice or tile group header, or SEI message.

In the same or another embodiment, the layout information of sub-region(s) (or sub-picture(s)) may be signaled in VPS or SPS. FIG. 17 shows an example 1700 of the syntax elements in VPS and SPS. In this example, vps_sub_picture_dividing_flag is sigalled in VPS. The flag may indicate whether input picture(s) are divided into multiple sub-regions or not. When the value of vps_sub_picture_dividing_flag is equal to 0, the input picture(s) in the coded video sequence(s) corresponding to the current VPS may not be divided into multiple sub-regions. In this case, the input picture size may be equal to the coded picture size (pic_width_in_luma_samples, pic_height_in_luma_samples), which is signaled in SPS. When the value of vps_sub_picture_dividing_flag is equal to 1, the input picture(s) may be divided into multiple sub-regions. In this case, the syntax elements vps_full_pic_width_in_luma_samples and vps_full_pic_height_in_luma_samples are signaled in VPS. The values of vps_full_pic_width_in_luma_samples and vps_full_pic_height_in_luma_samples may be equal to the width and height of the input picture(s), respectively.

In the same embodiment, the values of vps_full_pic_width_in_luma_samples and vps_full_pic_height_in_luma_samples may not be used for decoding, but may be used for composition and display.

In the same embodiment, when the value of vps_sub_picture_dividing_flag is equal to 1, the syntax elements pic_offset_x and pic_offset_y may be signaled in SPS, which corresponds to (a) specific layer(s). In this case, the coded picture size (pic_width_in_luma_samples, pic_height_in_luma_samples) signaled in SPS may be equal to the width and height of the sub-region corresponding to a specific layer. Also, the position (pic_offset_x, pic_offset_y) of the left-top corner of the sub-region may be signaled in SPS.

In the same embodiment, the position information (pic_offset_x, pic_offset_y) of the left-top corner of the sub-region may not be used for decoding, but may be used for composition and display.

In the same or another embodiment, the layout information (size and position) of all or sub-set sub-region(s) of (an) input picture(s), the dependency information between layer(s) may be signaled in a parameter set or an SEI message. FIG. 18 shows an example 1800 of syntax elements to indicate the information of the layout of sub-regions, the dependency between layers, and the relation between a sub-region and one or more layers. In this example, the syntax element num_sub_region indicates the number of (rectangular) sub-regions in the current coded video sequence. the syntax element num_layers indicates the number of layers in the current coded video sequence. The value of num_layers may be equal to or greater than the value of num_sub_region. When any sub-region is coded as a single layer, the value of num_layers may be equal to the value of num_sub_region. When one or more sub-regions are coded as multiple layers, the value of num_layers may be greater than the value of num_sub_region. The syntax element direct dependency flag[i][j] indicates the dependency from the j-th layer to the i-th layer. num_layers_for_region[i] indicates the number of layers associated with the i-th sub-region. sub_region_layer_id[i][j] indicates the layer_id of the j-th layer associated with the i-th sub-region. The sub_region_offset_x[i] and sub_region_offset_y[i] indicate the horizontal and vertical location of the left-top corner of the i-th sub-region, respectively. The sub_region_width [i] and sub_region_height[i] indicate the width and height of the i-th sub-region, respectively.

In one embodiment, one or more syntax elements that specify the output layer set to indicate one of more layers to be outputted with or without profile tier level information may be signaled in a high-level syntax structure, e.g. VPS, DPS, SPS, PPS, APS or SEI message. Referring to FIG. 19, the syntax element num_output_layer_sets indicating the number of output layer set (OLS) in the coded video sequence referring to the VPS may be signaled in the VPS. For each output layer set, output_layer_flag may be signaled as many as the number of output layers.

In the same embodiment, output_layer_flag[i] equal to 1 specifies that the i-th layer is output. vps_output_layer_flag [i] equal to 0 specifies that the i-th layer is not output.

In the same or another embodiment, one or more syntax elements that specify the profile tier level information for each output layer set may be signaled in a high-level syntax structure, e.g. VPS, DPS, SPS, PPS, APS or SEI message. Still referring to FIG. 19, the syntax element num_profile_tile_level indicating the number of profile tier level information per OLS in the coded video sequence referring to the VPS may be signaled in the VPS. For each output layer set, a set of syntax elements for profile tier level information or an index indicating a specific profile tier level information among entries in the profile tier level information may be signaled as many as the number of output layers.

In the same embodiment, profile_tier_level_idx[i][j] specifies the index, into the list of profile_tier_level( ) syntax structures in the VPS, of the profile_tier_level( ) syntax structure that applies to the j-th layer of the i-th OLS.

In the same or another embodiment, referring to the illustration 2000 of FIG. 20, the syntax elements num_profile_tile_level and/or num_output_layer_sets may be signaled when the number of maximum layers is greater than 1 (vps_max_layers_minus1>0).

In the same or another embodiment, referring to FIG. 20, the syntax element vps_output_layers_mode[i] indicating the mode of output layer signaling for the i-th output layer set may be present in VPS.

In the same embodiment, vps_output_layers_mode[i] equal to 0 specifies that only the highest layer is output with the i-th output layer set. vps_output_layer_mode[i] equal to 1 specifies that all layers are output with the i-th output layer set. vps_output_layer_mode[i] equal to 2 specifies that the layers that are output are the layers with vps_output_layer_flag[i][j] equal to 1 with the i-th output layer set. More values may be reserved.

In the same embodiment, the output_layer_flag[i][j] may or may not be signaled depending on the value of vps_output_layers_mode[i] for the i-th output layer set.

In the same or another embodiment, referring to FIG. 20, the flag vps_ptl_signal_flag[i] may be present for the i-th output layer set. Depending the value of vps_ptl_signal_flag [i], the profile_tier_level information for the i-th output layer set may or may not be signaled.

In the same or another embodiment, referring to the illustration 2100 of FIG. 21, the number of subpicture, max_sub_pics_minus1, in the current CVS may be signalled in a high-level syntax structure, e.g. VPS, DPS, SPS, PPS, APS or SEI message.

In the same embodiment, referring to FIG. 21, the subpicture identifier, sub_pic_id[i], for the i-th subpicture may be signalled, when the number of subpictures is greater than 1 (max_sub_pics_minus1>0).

In the same or another embodiment, one or more syntax elements indicating the subpicture identifier belonging to each layer of each output layer set may be signalled in VPS. Referring to the illustration 2200 of FIG. 22, the sub_pic_id layer[i][j][k], which indicates the k-th subpicture present in the j-th layer of the i-th output layer set. With those information, a decoder may recongnize which sub-picture may be decoded and outputtted for each layer of a specific output layer set.

In an embodiment, picture header (PH) is a syntax structure containing syntax elements that apply to all slices of a coded picture. A picture unit (PU) is a set of NAL units that are associated with each other according to a specified classification rule, are consecutive in decoding order, and contain exactly one coded picture. A PU may contain a picture header (PH) and one or more VCL NAL units composing a coded picture.

In an embodiment, an SPS (RBSP) may be available to the decoding process prior to it being referenced, included in at least one AU with TemporalId equal to 0 or provided through external means.

In an embodiment, an SPS (RBSP) may be available to the decoding process prior to it being referenced, included in at least one AU with TemporalId equal to 0 in the CVS, which contains one or more PPS referring to the SPS, or provided through external means.

In an embodiment, an SPS (RBSP) may be available to the decoding process prior to it being referenced by one or more PPS, included in at least one PU with nuh_layer_id equal to the lowest nuh_layer_id value of the PPS NAL units that refer to the SPS NAL unit in the CVS, which contains one or more PPS referring to the SPS, or provided through external means.

In an embodiment, an SPS (RBSP) may be available to the decoding process prior to it being referenced by one or more PPS, included in at least one PU with TemporalId equal to 0 and nuh_layer_id equal to the lowest nuh_layer_id value of the PPS NAL units that refer to the SPS NAL unit or provided through external means.

In an embodiment, an SPS (RBSP) may be available to the decoding process prior to it being referenced by one or more PPS, included in at least one PU with TemporalId equal to 0 and nuh_layer_id equal to the lowest nuh_layer_id value of the PPS NAL units that refer to the SPS NAL unit in the CVS, which contains one or more PPS referring to the SPS, or provided through external means or provided through external means.

In the same or another embodiment, pps_seq_parameter_set_id specifies the value of sps_seq_parameter_set_id for the referenced SPS. The value of pps_seq_parameter_set_id may be the same in all PPSs that are referred to by coded pictures in a CLVS.

In the same or another embodiment, all SPS NAL units with a particular value of sps_seq_parameter_set_id in a CVS may have the same content.

In the same or another embodiment, regardless of the nuh_layer_id values, SPS NAL units may share the same value space of sps_seq_parameter_set_id.

In the same or another embodiment, the nuh_layer_id value of a SPS NAL unit may be equal to the lowest nuh_layer_id value of the PPS NAL units that refer to the SPS NAL unit.

In an embodiment, when an SPS with nuh_layer_id equal to m is referred to by one or more PPS with nuh_layer_id equal to n. the layer with nuh_layer_id equal to m may be the same as the layer with nuh_layer_id equal to n or a (direct or indirect) reference layer of the layer with nuh_layer_id equal to m.

In an embodiment, a PPS (RBSP) shall be available to the decoding process prior to it being referenced, included in at least one AU with TemporalId equal to the TemporalId of the PPS NAL unit or provided through external means.

In an embodiment, a PPS (RBSP) may be available to the decoding process prior to it being referenced, included in at least one AU with TemporalId equal to the TemporalId of the PPS NAL unit in the CVS, which contains one or more PHs (or coded slice NAL units) referring to the PPS, or provided through external means.

In an embodiment, a PPS (RBSP) may be available to the decoding process prior to it being referenced by one or more PHs (or coded slice NAL units), included in at least one PU with nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In an embodiment, a PPS (RBSP) may be available to the decoding process prior to it being referenced by one or more PHs (or coded slice NAL units), included in at least one PU with TemporalId equal to the TemporalId of the PPS NAL unit and nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In the same or another embodiment, ph_pic_parameter_set_id in PH specifies the value of pps_pic_parameter_set_id for the referenced PPS in use. The value of pps_seq_parameter_set_id may be the same in all PPSs that are referred to by coded pictures in a CLVS.

In the same or another embodiment, All PPS NAL units with a particular value of pps_pic_parameter_set_id within a PU shall have the same content.

In the same or another embodiment, regardless of the nuh_layer_id values, PPS NAL units may share the same value space of pps_pic_parameter_set_id.

In the same or another embodiment, the nuh_layer_id value of a PPS NAL unit may be equal to the lowest nuh_layer_id value of the coded slice NAL units that refer to the NAL unit that refer to the PPS NAL unit.

In an embodiment, when a PPS with nuh_layer_id equal to m is referred to by one or more coded slice NAL units with nuh_layer_id equal to n. the layer with nuh_layer_id equal to m may be the same as the layer with nuh_layer_id equal to n or a (direct or indirect) reference layer of the layer with nuh_layer_id equal to m.

In an embodiment, a PPS (RBSP) shall be available to the decoding process prior to it being referenced, included in at least one AU with TemporalId equal to the TemporalId of the PPS NAL unit or provided through external means.

In an embodiment, a PPS (RBSP) may be available to the decoding process prior to it being referenced, included in at least one AU with TemporalId equal to the TemporalId of the PPS NAL unit in the CVS, which contains one or more PHs (or coded slice NAL units) referring to the PPS, or provided through external means.

In an embodiment, a PPS (RBSP) may be available to the decoding process prior to it being referenced by one or more PHs (or coded slice NAL units), included in at least one PU with nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In an embodiment, a PPS (RBSP) may be available to the decoding process prior to it being referenced by one or more PHs (or coded slice NAL units), included in at least one PU with TemporalId equal to the TemporalId of the PPS NAL unit and nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In the same or another embodiment, ph_pic_parameter_set_id in PH specifies the value of pps_pic_parameter_set_id for the referenced PPS in use. The value of pps_seq_parameter_set_id may be the same in all PPSs that are referred to by coded pictures in a CLVS.

In the same or another embodiment, All PPS NAL units with a particular value of pps_pic_parameter_set_id within a PU shall have the same content.

In the same or another embodiment, regardless of the nuh_layer_id values, PPS NAL units may share the same value space of pps_pic_parameter_set_id.

In the same or another embodiment, the nuh_layer_id value of a PPS NAL unit may be equal to the lowest nuh_layer_id value of the coded slice NAL units that refer to the NAL unit that refer to the PPS NAL unit.

In an embodiment, when a PPS with nuh_layer_id equal to m is referred to by one or more coded slice NAL units with nuh_layer_id equal to n. the layer with nuh_layer_id equal to m may be the same as the layer with nuh_layer_id equal to n or a (direct or indirect) reference layer of the layer with nuh_layer_id equal to m.

In an embodiment, when a flag, no temporal sublayer switching flag is signaled in a DPS, VPS, or SPS, the TemporalId value of a PPS referring to the parameter set containing the flag equal to 1 may be equal to 0, while the TemporalId value of a PPS referring to the parameter set containing the flag equal to 1 may be equal to or greater than the TemporalId value of the parameter set.

In an embodiment, each PPS (RBSP) may be available to the decoding process prior to it being referenced, included in at least one AU with TemporalId less than or equal to the TemporalId of the coded slice NAL unit (or PH NAL unit) that refers it or provided through external means. When the PPS NAL unit is included in an AU prior to the AU containing the coded slice NAL unit referring to the PPS, a VCL NAL unit enabling a temporal up-layer switching or a VCL NAL unit with nal_unit_type equal to STSA_NUT, which indicates that the picture in the VCL NAL unit may be a step-wise temporal sublayer access (STSA) picture, may not be present subsequent to the PPS NAL unit and prior to the coded slice NAL unit referring to the APS.

In the same or another embodiment, the PPS NAL unit and the coded slice NAL unit (and its PH NAL unit) referring to the PPS may be included in the same AU.

In the same or another embodiment, the PPS NAL unit and the STSA NAL unit may be included in the same AU, which is prior to the coded slice NAL unit (and its PH NAL unit) referring to the PPS.

In the same or another embodiment, the STSA NAL unit, the PPS NAL unit and the coded slice NAL unit (and its PH NAL unit) referring to the PPS may be present in the same AU.

In the same embodiment, the TemporalId value of the VCL NAL unit containing an PPS may be equal to the TemporalId value of the prior STSA NAL unit.

In the same embodiment, the picture order count (POC) value of the PPS NAL unit may be equal to or greater than the POC value of the STSA NAL unit.

In the same embodiment, the picture order count (POC) value of the coded slice or PH NAL unit, which refers to the PPS NAL unit, may be equal to or greater than the POC value of the referenced PPS NAL unit.

APS NAL units, Regardless of the nuh_layer_id values, may share the same value spaces of adaptation_parameter_set_id and aps_params_type.

The value of sps_video_parameter_set_id shall be the same in all SPSs that are referred to by coded pictures in a CVS, across layers.

In an embodiment, in NAL unit header semantics of the current VVC specification draft JVET-P2001 (editorially updated by JVET-Q0041), the value of nuh_layer_id for non-VCL NAL units is constrained as follows: If nal_unit_type is equal to PPS_NUT, PREFIX_APS_NUT, or SUFFIX_APS_NUT, nuh_layer_id shall be equal to the lowest nuh_layer_id value of the coded slice NAL units that refer to the NAL unit. Otherwise, if nal_unit_type is equal to SPS NUT, nuh_layer_id shall be equal to the lowest nuh_layer_id value of the PPS NAL units that refer to the SPS NAL unit.

Figure 22:
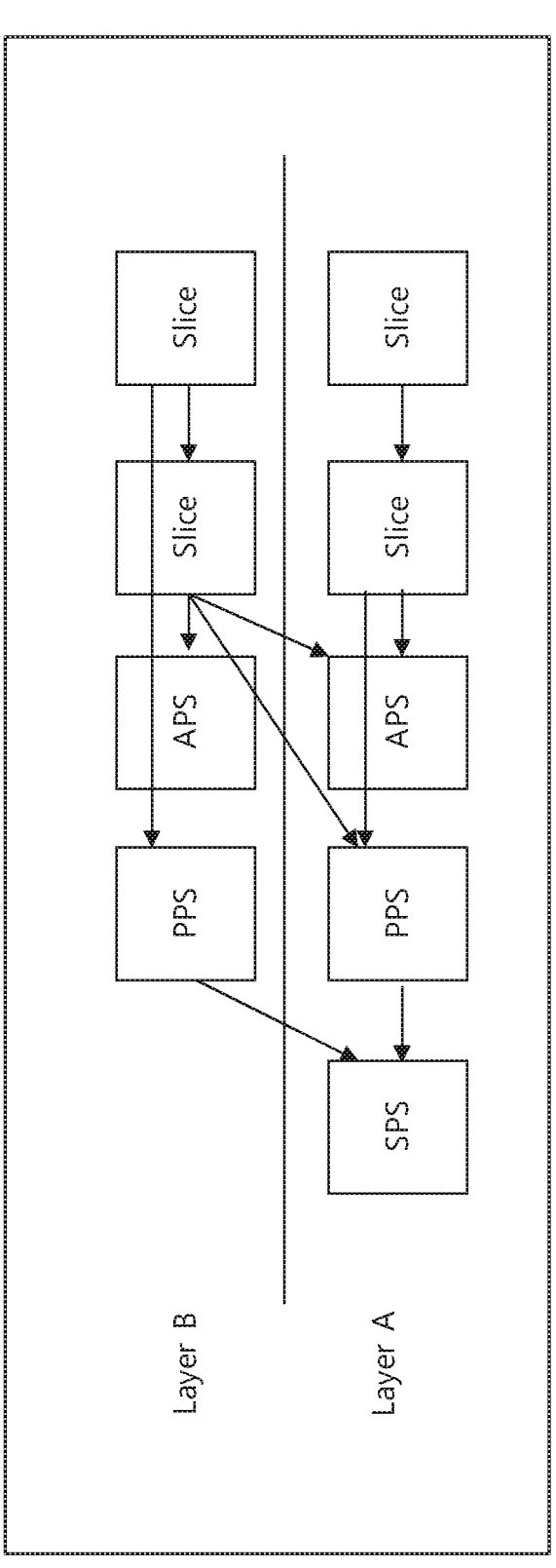
FIG. 22 is an example of parameter set reference in a non-reference layer.

The contraints are intended to allow the parameter sets (SPS, PPS, APS) reference across layers, so that a coded slice NAL unit can/shall only refer to a PPS/APS NAL unit in the same or a lower layer, and a PPS NAL unit can/shall only refer to a SPS NAL unit in the same or a lower layer. Note that a coded slice VCL NAL unit can refer to a PPS/APS NAL unit in a non-reference layer, with the given contraints. For example, FIG. 22 shows a simple example 2200 with two layers, where the nuh_layer_id value of the layer B is greater than the nuh_layer_id value of the layer A, and the layer A is not a direct/indirect reference layer of the layer B. In that case, a coded slice VCL NAL unit in the layer B can refer to a PPS/APS with nuh_layer_id equal to nuh_layer_id of the layer A, because there is not a contraint to disallow a PPS/APS reference in a non-reference layer. Still, nuh_layer_id of the PPS/APS is equal to the lowest nuh_layer_id value of the coded slice NAL units that refer to the NAL unit. In the example, the layer A and the layer B may belong to different (output) layer sets, and the NAL units of the layer A can be discarded by a bitstream extraction process, while the NAL unit of the layer B are still present in the output bitstream. Then, the PPS/APS NAL units referred to by the coded slice NAL unit of the layer B may not be present in the output bitstream.

In the same or another embodiment, in order to address the above issue, the current constraints need to be improved. The proposed constraint is that a coded slice NAL unit shall only refer to a PPS/APS in the same layer or in a (direct) reference layer, and a PPS NAL unit shall only refer to a SPS in the same layer or in a (direct) reference layer. In FIG. 22, if the layer A is a reference layer of the layer B, both layers shall belong to the same (output) layer set, and shall be present in an extracted bitstream, always. Then, the SPS/PPS/APS VCL NAL unit referred to by a NAL unit in another layer are never removed.

According to embodiments, NAL unit header semantics include features such that when a coded slice NAL unit refers to a non-VCL NAL unit with nal_unit_type equal to PPS_NUT, PREFIX_APS_NUT, or SUFFIX_APS_NUT, the layer of the non-VCL NAL unit shall be equal to the layer of the coded slice NAL unit or a direct reference layer of the coded slice NAL unit, and, when a PPS NAL unit refers to an SPS NAL unit, the layer of the SPS NAL unit shall be equal to the layer of the PPS NAL unit or a direct reference layer of the PPS NAL unit.

According to embodiments, NAL unit header semantics include features such that when a coded slice NAL unit refers to a non-VCL NAL unit with nal_unit_type equal to PPS_NUT, PREFIX_APS_NUT, or SUFFIX_APS_NUT, the layer of the non-VCL NAL unit shall be equal to the layer of the coded slice NAL unit or a direct/indirect reference layer of the coded slice NAL unit, and, when a PPS NAL unit refers to an SPS NAL unit, the layer of the SPS NAL unit shall be equal to the layer of the PPS NAL unit or a direct/indirect reference layer of the PPS NAL unit.

The techniques for signaling adaptive resolution parameters described above, can be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
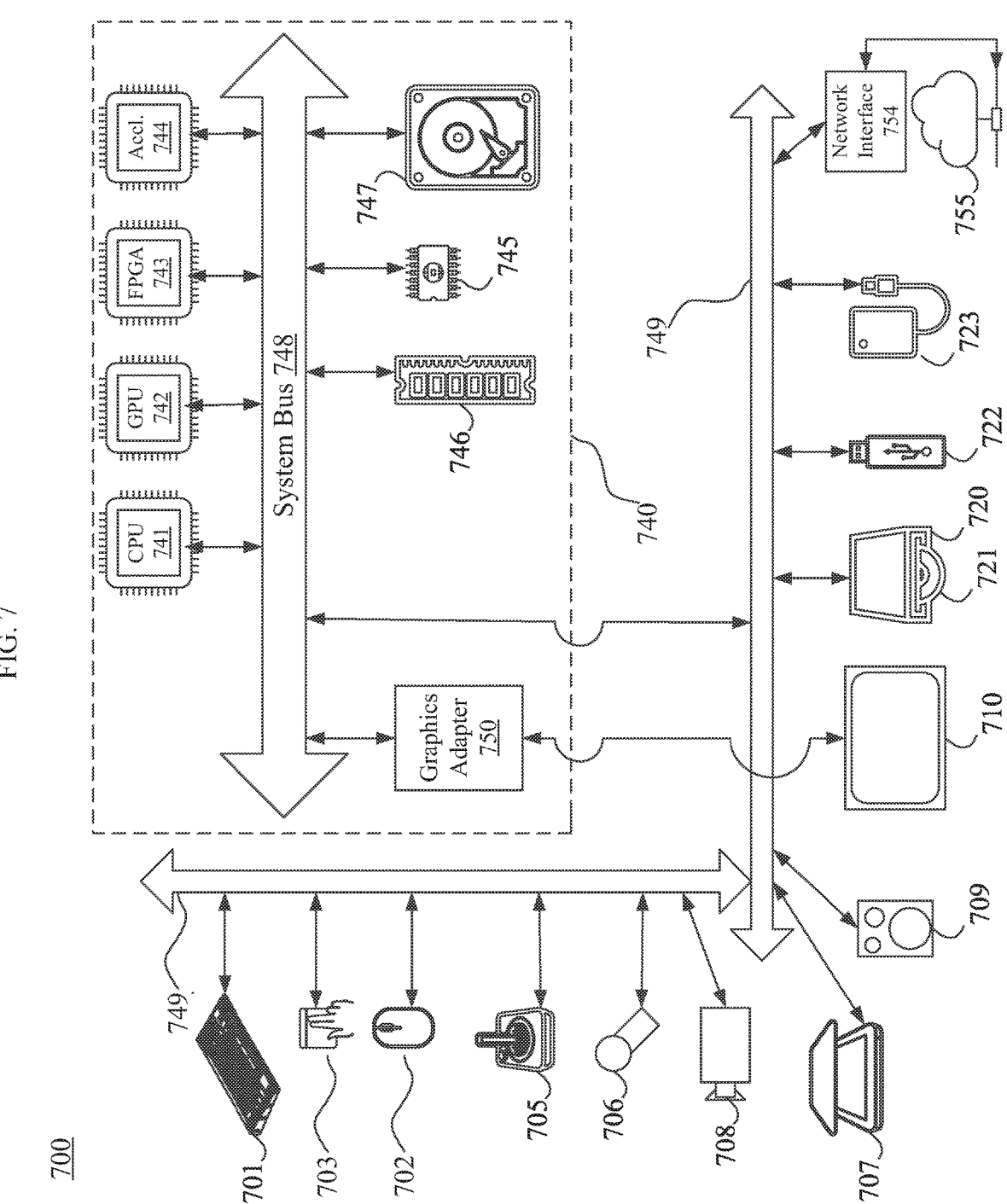
FIG. 7 is a schematic illustration of a computer system in accordance with an embodiment.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove, or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface to one or more communication networks 755. Networks 755 can for example be wireless, wireline, optical. Networks 755 can further be local, wide-area, metropolitan, vehicular and industrial, real-time, delay-tolerant, and so on. Examples of networks 755 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters 754 that attached to certain general purpose data ports or peripheral buses (749) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage 747 such as internal non-user accessible hard drives, SSDs, and the like, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, the method comprising:

obtaining video data comprising data of a plurality of pictures, and of which a same value space of values of adaptation_parameter_set_id and aps_params_type is shared across spatial layers of the video data regardless of nuh_layer_id values, and of which a same value space of sps_video_parameter_set_id is shared in a sequence parameter set;

determining, among the video data, whether references are associated with any of a first access unit (AU) and a second AU based on comparing respective POC values with the POC signal value, determining that the at least first one of the references comprises a first value that is less than the POC signal value, and determining that the at least second one of the references comprises a second value that is equal to or greater than the POC signal value; and decoding the video data based on at least a first one of the references being set to the first AU and at least a second one of the references being set to the second AU based on a picture order count (POC) signal value.

2. The method according claim 1, wherein the references comprise at least one of pictures, slices, and tiles of the video data.

3. The method according to claim 1, wherein the references comprise the slices, and wherein the POC signal value is included in a slice header of the video data.

4. The method according to claim 1, wherein outputting the at least first one of the references set to the first AU and the at least second one of the references set to the second AU based on the POC signal value is further based on whether a quantity of the references comprises one of a plurality of POC values that is less than the POC signal value.

5. The method according to claim 1, wherein the POC signal value is included in a video parameter set (VPS) of the video data, and wherein the method further comprises determining whether the VPS data comprises at least one flag indicating whether one or more of the references are divided into a plurality of sub-regions.

6. The method according to claim 5, further comprising:

determining, in a case where the at least one flag indicates that the one or more of the references are divided into the plurality of sub-regions, a signaling value, included in the sequence parameter set of the video data, specifying an offset of a portion of at least one of the sub-regions.

7. The method according to claim 1, wherein the pictures represent a spherical 360 picture.

8. A method for video encoding, the method comprising:

obtaining video data comprising data of a plurality of pictures; and encoding the video data such that a same value space of values of adaptation_parameter_set_id and aps_params_type is shared across spatial layers of the video data regardless of nuh_layer_id values, and of which a same value space of sps_video_parameter_set_id is shared in a sequence parameter set, and encoding the video data further comprises determining, among the video data, whether references are associated with any of a first access unit (AU) and a second AU based on comparing respective POC values with the POC signal value, determining that the at least first one of the references comprises a first value that is less than the POC signal value, and determining that the at least second one of the references comprises a second value that is equal to or greater than the POC signal value, and based on at least a first one of the references being set to the first AU and at least a second one of the references being set to the second AU based on a picture order count (POC) signal value.

9. The method according claim 8, wherein the references comprise at least one of pictures, slices, and tiles of the video data.

10. The method according to claim 8, wherein the references comprise the slices, and wherein the POC signal value is included in a slice header of the video data.

11. The method according to claim 8, wherein the at least first one of the references set to the first AU and the at least second one of the references set to the second AU based on the POC signal value is further based on whether a quantity of the references comprises one of a plurality of POC values that is less than the POC signal value.

12. The method according to claim 8, wherein the POC signal value is included in a video parameter set (VPS) of the video data, and wherein the method further comprises determining whether the VPS data comprises at least one flag indicating whether one or more of the references are divided into a plurality of sub-regions.

13. The method according to claim 12, further comprising:

determining, in a case where the at least one flag indicates that the one or more of the references are divided into the plurality of sub-regions, a signaling value, included in the sequence parameter set of the video data, specifying an offset of a portion of at least one of the sub-regions.

14. The method according to claim 8, wherein the pictures represent a spherical 360 picture.

15. A method of encoding visual media data, the method comprising:

generating a bitstream of the visual media data according to an encoding process;

the bitstream of the visual media data comprising encoded video data such that a same value space of values of adaptation_parameter_set_id and aps_params_type is shared across spatial layers of the video data regardless of nuh_layer_id values, and a same value space of sps_video_parameter_set_id is shared in a sequence parameter set, and the encoding process comprises encoding and transmitting the video data based on determining, among the video data, whether references are associated with any of a first access unit (AU) and a second AU based on comparing respective POC values with the POC signal value, determining that the at least first one of the references comprises a first value that is less than the POC signal value, and determining that the at least second one of the references comprises a second value that is equal to or greater than the POC signal value, and based on at least a first one of the references being set to the first AU and at least a second one of the references being set to the second AU based on a picture order count (POC) signal value, and transmitting the generated bitstream of the visual media data.

16. The method according claim 15, wherein the references comprise at least one of pictures, slices, and tiles of the video data.

17. The method according to claim 15,
wherein the references comprise the slices, and
wherein the POC signal value is included in a slice header
of the video data.

18. The method according to claim 15, wherein the at least
first one of the references set to the first AU and the at least
second one of the references set to the second AU based on
the POC signal value is further based on whether a quantity
of the references comprises one of a plurality of POC values
that is less than the POC signal value.

19. The method according to claim 15,
wherein the POC signal value is included in a video
parameter set (VPS) of the video data, and
wherein the method further comprises determining
whether the VPS data comprises at least one flag
indicating whether one or more of the references are
divided into a plurality of sub-regions.

20. The method according to claim 19, wherein he video
encoding method further comprises determining, in a case
where the at least one flag indicates that the one or more of
the references are divided into the plurality of sub-regions,
a signaling value, included in the sequence parameter set of
the video data, specifying an offset of a portion of at least
one of the sub-regions.

* * * * *